United States Patent [19]

Hasegawa et al.

[11] Patent Number: 4,897,739
[45] Date of Patent: Jan. 30, 1990

[54] MULTI-CHANNEL RECORDING APPARATUS USING A PLURALITY OF HEADS IN TURN

[75] Inventors: Masahide Hasegawa; Mitsuhiro Otokawa, both of Kanagawa; Hidetoshi Matsuoka, Tokyo; Noritsugu Hirata, Kanagawa, all of Japan

[73] Assignee: Canon Kabushiki Kaisha, Tokyo, Japan

[21] Appl. No.: 34,793

[22] Filed: Apr. 3, 1987

[30] Foreign Application Priority Data

| Apr. 7, 1986 [JP] | Japan | 61-078393 |
|---|---|---|
| Apr. 9, 1986 [JP] | Japan | 61-080146 |
| Apr. 9, 1986 [JP] | Japan | 61-080147 |
| Jun. 23, 1986 [JP] | Japan | 61-144713 |
| Jun. 23, 1986 [JP] | Japan | 61-144714 |

[51] Int. Cl.⁴ .................. H04N 5/782; G11B 15/14; G11B 5/53
[52] U.S. Cl. .................. 360/37.1; 360/23; 360/33.1; 360/61; 360/64; 360/84; 358/310; 358/335
[58] Field of Search .................. 360/22, 23, 64, 84, 360/77, 32, 33.1, 18, 19.1, 10.3, 61, 85, 37.1; 358/310, 335, 319

[56] References Cited

U.S. PATENT DOCUMENTS

| 4,358,799 | 11/1982 | deNiet | 360/84 |
| 4,462,049 | 7/1984 | Heitmann | 360/10.3 |
| 4,614,980 | 9/1986 | Ninomiya et al. | 360/22 |
| 4,757,391 | 7/1988 | Hirota et al. | 360/22 |

FOREIGN PATENT DOCUMENTS

| 53-129012 | 10/1978 | Japan | 360/22 |
| 2027252 | 2/1980 | United Kingdom | 360/10.3 |

Primary Examiner—Alan Faber
Assistant Examiner—Steven R. Garland
Attorney, Agent, or Firm—Robin, Blecker, Daley & Driscoll

[57] ABSTRACT

A multi-channel recording apparatus in which n rotary heads (n is 3 or higher integer) are arranged on the outer peripheral edge of a drum in evenly spaced relation, and a tape-shaped recording medium is trained round the drum over an angular range of at least $360° \times (1-1/n)$, while recording $(n-1)$ channels of a signal on the recording medium by using the $(n-1)$ of the n heads which are simultaneously tracing on the medium.

6 Claims, 20 Drawing Sheets

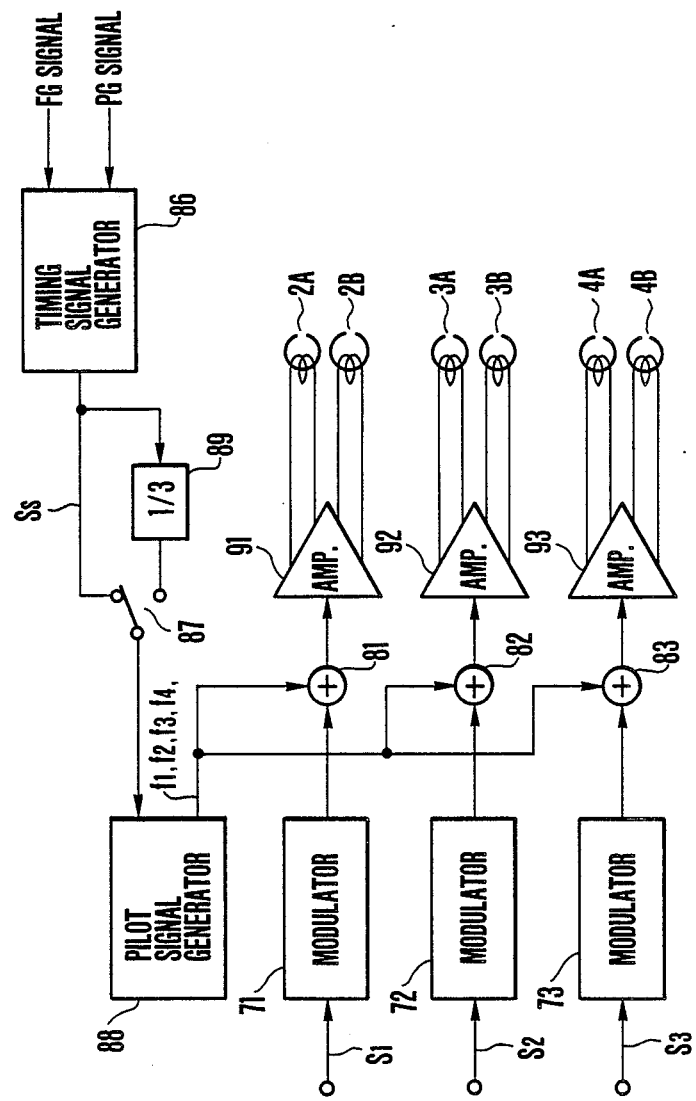
F I G.15

F I G. 17 (A)
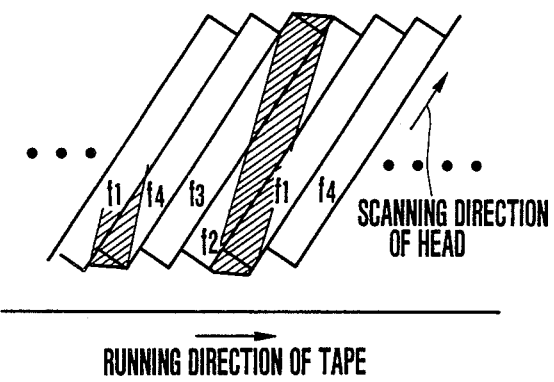
SCANNING DIRECTION OF HEAD
RUNNING DIRECTION OF TAPE
F I G. 17 (B)
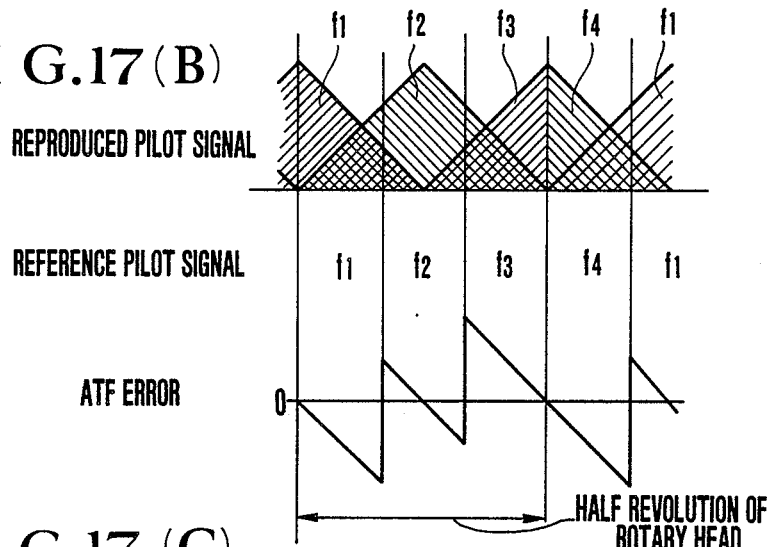
REPRODUCED PILOT SIGNAL
REFERENCE PILOT SIGNAL
ATF ERROR
HALF REVOLUTION OF ROTARY HEAD
F I G. 17 (C)
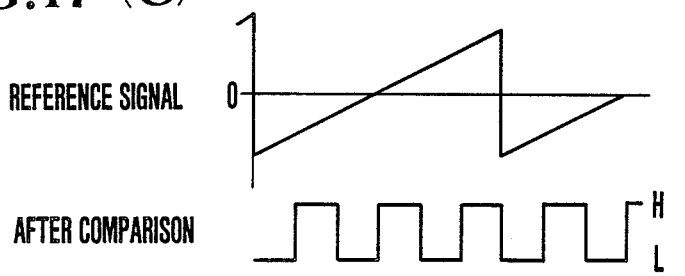
REFERENCE SIGNAL
AFTER COMPARISON F I G.18 (A)
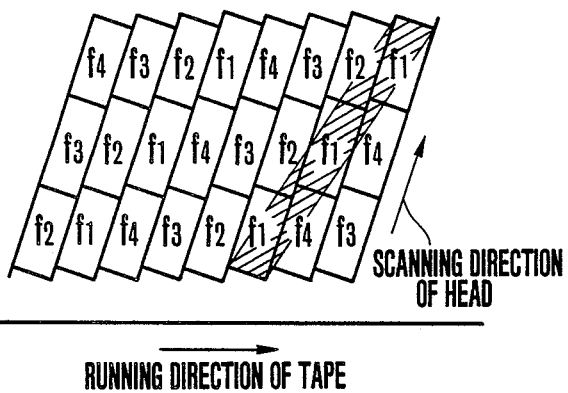
F I G.18 (B)
F I G.18 (C)
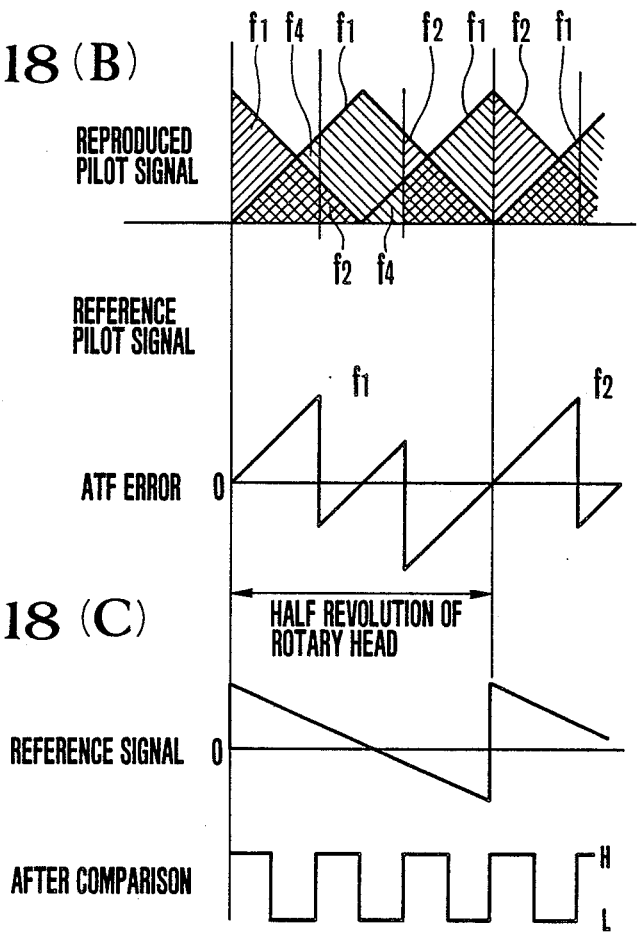

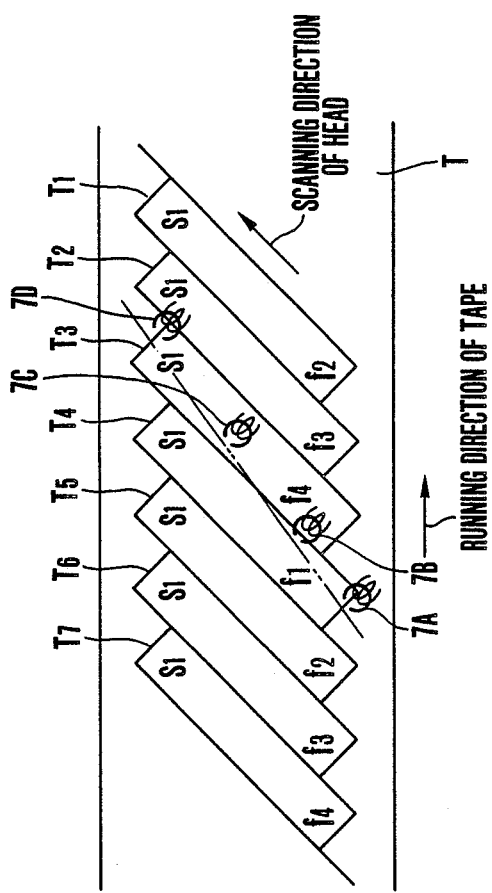
F I G. 21
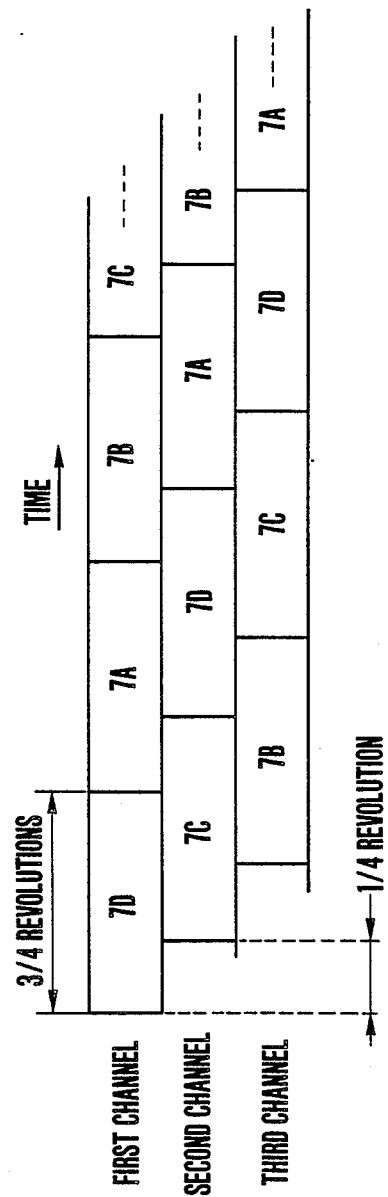
F I G. 22

MULTI-CHANNEL RECORDING APPARATUS USING A PLURALITY OF HEADS IN TURN

BACKGROUND OF THE INVENTION:

1. Field of the Invention:

This invention relates to a multi-channel recording apparatus in which simultaneous recording of signals of a plurality of channels is made on a tape-shaped recording medium (hereinafter simply called "tape").

2. Description of the Related Art:

Recently, the electronic technique, high-precision machining technique and the like have advanced to improve the magnetic recording density and a digital signal processing technique has been developed. These lead, at present, to realize digital magnetic recording of sound signals. Further, even in the field of video signals, application of the digital recording technique is being promoted. However, because the digital signal necessarily has as wide a band as more than ten times that of the analog signal, to allow for the magnetic recording and/or reproduction apparatus, for example, VTR, to record the digital video signal, either one of the following means must be carried out: in comparison with the case of the analog video signals, (i) to raise the relative speed of the magnetic tape and the magnetic head, (ii) to divide the video signal into a plurality of channels, and (iii) to increase the recording density by altering the materials of the magnetic tape and the magnetic head. Of these, (ii) has the following merits over the others:

1. The transmission band can be lowered to 1/N (where N is the number of channels).
2. The mechanical problems such as head touch, tape damage or the like and the problem of fidelity are fewer.

In the past, as the head arrangement for a VTR in which the video signal is divided into a plurality of channels as has been described above, and these are simultaneously recorded on, or reproduced from, the magnetic tape or the like, what is depicted in FIG. 1 has been considered. For note, the illustration is made for a case of three channels, or N=3.

As shown in FIG. 1, a rotary drum 1 of cylindrical shape has 2N or 6 magnetic heads 2A, 2B, 3A, 3B, 4A and 4B arranged in 60° spaced relation to each other. Also, the paired magnetic heads 2A and 2B, 3A and 3B, or 4A and 4B are differentiated 180° in phase from each other. The three flows of signals are allocated to the respective individual pairs of magnetic heads, so that they are simultaneously recorded on the magnetic tape T is trained round the rotary drum 1 over an angular range of more than 180° by loading posts 5 and 5'. FIG. 2 illustrates recording patterns on the tape as the head arrangement of FIG. 1 operates. In this case, by changing the azimuth angle between the magnetic heads denoted by the subscripts A and B in each pair, the azimuth angle of the adjacent tracks formed on the magnetic tape T can be changed. This makes it possible to achieve a high guard-bandless recording density.

In such a manner, according to the above-described apparatus, the signal which when digitized would otherwise take a very wide band such as the video signal also can be recorded with reduction of that band to 1/N (in this instance, ⅓). None the less, in this apparatus, it is also possible to decrease the tape feeding speed to ⅓ and use one pair of the magnetic heads 2A and 2B to record only one flow of signals. If the diameter of the rotary drum 1, the arrangement of the magnetic heads and others are made set in conformity with the already existing single-channel type apparatus, therefore, compatibility can be preserved therebetween. Hence, the multi-channel apparatus is evaluated as having excellent utilities.

However, in the magnetic recording-reproduction apparatus of the configuration described above, in order to make simultaneous recording of N channels, 2N magnetic heads must be used. Moreover, the equal number of transmission systems such as rotary transmitters, pre-amplifiers and others to the number of used magnetic heads must be provided. Therefore, a problem arose that the apparatus increased in the entire scale, and became expensive.

Also, it is being considered that the number of magnetic heads to be installed on the rotary drum is made equal to the number of divided channels and the angle the magnetic tape is trained round this drum is increased nearly to 360°, when the recording or reproducing is performed in one channel by each head. In this case, because the signal drops out for a prescribed period during the time when the drum 1 rotates one revolution, a time axis compression circuit and either a circuit for interpolating that period or a tim axis expanding circuit must be provided. Therefore, an alternate problem arises that the complexity of structure of the signal processing system is increased. Further, as the diameter of the rotary drum is made smaller, the difficulty of training the magnetic tape on it increases, because the training angle is as wide as 360°. This also causes the dropping-out period of the signal to increase. Therefore, an additional problem arises that the apparatus cannot be minimized in size.

By the way, the conventional single-channel magnetic recording and reproduction apparatus necessarily has the capability of automatic tracking control to operate when in the reproducing mode. With this, the tracking error of the reproducing head is automatically corrected. For this purpose, there have been known two methods in the art, one of which is to use a control signal recorded in the linear track in correcting the tracking error of the reproducing head (CTL method), and the other of which is first to record four pilot signals of low frequencies slightly differing from each other successively one at an allocated track thereto, and, when to reproduce, then to use the cross talk reproduced from the adjacent tracks by the magnetic heads in correcting the tracking error (pilot method).

However, in application of such automatic tracking methods as has been described above to the recording and reproduction apparatus capable of selectively recording one flow of signals and three flows of signals, there were the following problems.

In the case of, for example, the CTL method, when one flow of signals is recorded and reproduced, the CTL signal takes the form of one pulse signal per two tracks or one track, as is well known in the art. But, if the number of the pulse signal per two tracks or one track is 1 even for the recording of the three flows of signals, no discrimination from the area in which one flow of signals was recorded can be made when in the reproduction mode. Therefore, when that area of the tape which has the signals of three channels recorded hereon is to be reproduced, it will result that the tape is caused to run at the same speed when the signal of single channel is reproduced. This implies that the reproducing is operated in the same manner. Thus, a problem of failing reproduction of the three flows of signals occurs. To avoid this, it may be considered that when the recording is changed over from the one flow to the three flows of signals, the CTL signal is made to correspond to one of the three flows so that when in reproduction mode, it becomes possible to make discrimination between the single-channel and triple-channel recorded areas of the tape. But if it happens that the tape running speed when in the single-channel recording becomes equal to that when in the triple-channel recording, in other words, the track pitch for the former differs 3 times as wide from that for the latter, the above-described discrimination cannot also be made. Also, the use of the CLT method necessitates a track and a magnetic head both solely used for automatic tracking. This hinders a minimization of the size of the apparatus and an increase of the recording density from being achieved.

Meanwhile, as the pilot method is applied, if the four pilot signals $f_1$ to $f_4$ are recorded successively on the respective tracks $TR_1$ to $TR_4$ in superimposed relation to the video signals as shown in FIG. 3, the triple-channel and single-channel recorded areas cannot be discriminated from each other. And there is need to differentiate all these pilot signals in frequency and also the timings at which they are produced from one another, complicating the structure of the required circuit therefor. To avoid this, if the succession of the four pilot signals is adjusted according to one of the three flows of signals as shown in FIG. 4, the above-identified discrimination becomes possible to perform. But, because there are a good many of those sections of the boundaries between the adjacent two tracks across which the frequencies of the pilot signals come to be the same, it will become impossible in between the adjacent tracks at those sections to discriminate which track should be sought. Hence, the tracking control can no longer be made. Of course, even for this case, if a sample and hold circuit is used, the tracking error can be detected. In more detail, as, for example, the third head errs from tracking the third track $TR_3$, when it is sided toward the second track $TR_2$, its output includes the pilot signal $f_4$. The level of this pilot signal after having been sampled and held is compared with the level of the pilot signal $f_2$ obtained from the adjacent track $TR_4$ to the track $TR_3$, as the latter is also sampled and held, when that error of tracking is detected. If the lineality of the track is bad, however, such a measure cannot provide a sufficient tracking performance. Another problem in considerably increasing the scale of circuitry occurs.

SUMMARY OF THE INVENTION:

An object of the present invention is to provide a multi-channel recording apparatus which can solve the above-described problems of the multi-channel recording.

Another object of the present invention is to provide a multi-channel recording apparatus of reduced size and low price without increasing the number of heads.

Under such objects, according to the present invention, in one embodiment thereof, a multi-channel recording apparatus is proposed, comprising a cylinder member having n rotary heads (where n is an integer of not less than 3) positioned on the outer peripheral surface thereof to rotate with a phase difference of $(360/n)°$ from each other, a tape guide member for training a tape-shaped recording medium round the cylinder member over an angular range of not less then $(360 \times (n-1)/n)°$, signal input means of $(n-1)$ channels, and recording means including supply means capable of simultaneously supplying the $(n-1)$ channels of signals to the $(n-1)$ ones of the n heads which are tracing on the recording medium.

Still another object of the invention is to provide a multi-channel recording apparatus which allows for good tracking control to be made when in reproduction without having to increase the complexity of structure of the circuitry.

Under such an object, according to the present invention, in one embodiment thereof, a multi-channel recording apparatus is proposed, comprising input means for inputting n channels of information signals (n is an integer of not less than 3), means for simultaneously recording the signals of the n channels in adjacent n tracks on a single recording medium, and means for superimposing on the information signals of at least two of the n channels a plurality of pilot signals of prescribed different frequencies from each other and from channel to channel.

Also, under the same object, according to the present invention, in another embodiment thereof, a recording apparatus is proposed, comprising n rotary heads (n is an integer of not less than 3), means for generating n pilot signals having different frequencies from one another, and recording means for supplying the n pilot signals to the n rotary heads in one-to-one relation and recording them on a recording medium.

Also, under the same object, according to the present invention, in still another embodiment thereof, a recording apparatus is proposed, comprising n rotary heads rotating with a phase difference of $(360/n)°$ from each other (n is an integer of not less than 3), means for generating a plurality of pilot signals having different frequencies from one another selectively each time the rotary head rotates $(360/n)°$, and means for supplying the signals produced from the generating means to the n heads and recording them on a recording medium.

A further object of the invention is to provide a recording apparatus capable of either of single-channel and multi-channel recordings, and which enables the recorded signal to be discriminated between the single-channel and multi-channel recorded ones when in reproduction.

Under such an object, according to the present invention, in one embodiment thereof, a recording apparatus is proposed, comprising recording means capable of taking a first mode in which m channels of information signals are simultaneously recorded on a single recording medium and a second mode in which only one channel of information signals is recorded on the recording medium m is an integer of not less than 2), generating means for producing a plurality of pilot signals having different frequencies from one another selectively in sequence, the period of performing the aforesaid selection being changed over between when the recording means is in the first mode and when in the second mode, and superimposing means for superimposing the pilot signal produced from the generating means onto the information signal being recorded by the recording means.

Under the same object, according to the present invention, in another embodiment thereof, a recording apparatus is proposed, comprising recording means capable of taking a first mode in which m channels of information signals are simultaneously recorded on a single recording medium and a second mode in which only one channel of information signals is recorded on the recording medium (m is an integer of not less than 2), generating means for producing a plurality of pilot signals of different frequency from one another, the generating means being arranged upon operation of the recording means in one of the two modes not to produce the one of the plurality of pilot which would be produced when the recording means is in the other mode, and means for superimposing the pilot signal produced from the generating means onto the information signal being recorded by the recording means.

Other objects and features of the invention than those described above will become apparent from the following detailed description of embodiments thereof by reference to the accompanying drawings in which:

BRIEF DESCRIPTION OF THE DRAWINGS:

FIG. 15 is a block diagram illustrating the construction of a recording circuit for forming the recording patterns of FIG. 14.

FIGS. 17(A)-17(C), 18(A)-18(C) and 19(A), 19(B) are each taken to explain the manner in which the discriminating circuit of FIG. 16 operates.

FIG. 21 is a plan view illustrating the recording patterns on the magnetic tape by the apparatus of FIG. 20.

FIG. 22 is a diagram illustrating the change-over timing of, the signal supplied to each head.

Figure 1:
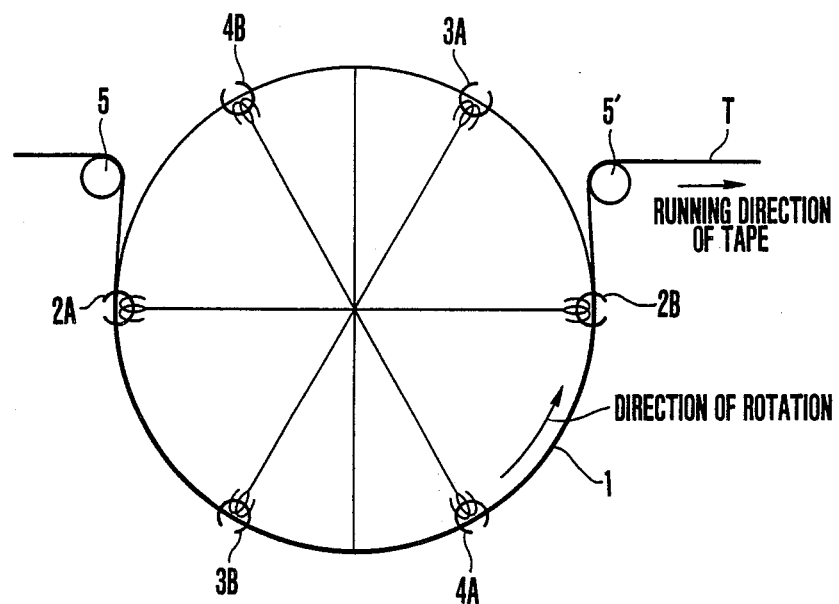
FIG. 1 is a schematic diagram of an example of the head arrangement of the multi-channel recording apparatus.
Figure 2:
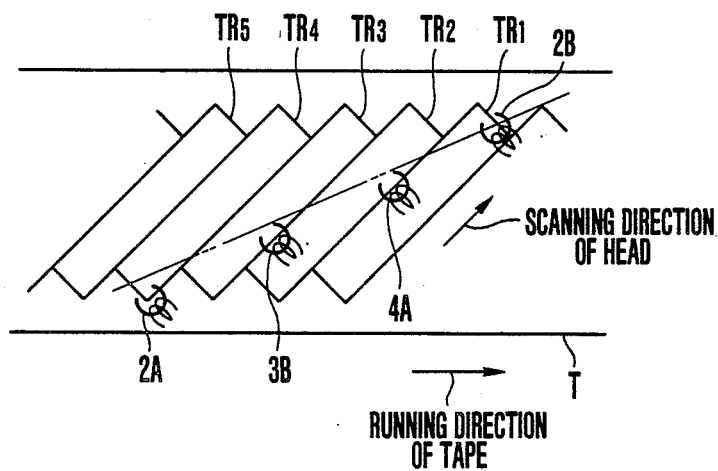
FIG. 2 is a plan view illustrating the recording patterns formed on a tape by the head arrangement of FIG. 1.

DETAILED DESCRIPTION OF THE PREFERRED EMBODIMENTS:

The present invention is next described in connection with one embodiment thereof by reference to FIGS. 5 to 8. For note, the same or similar parts as or to those in the already described examples are denoted by the same reference characters and their detailed explanation is omitted here.

Figure 5:
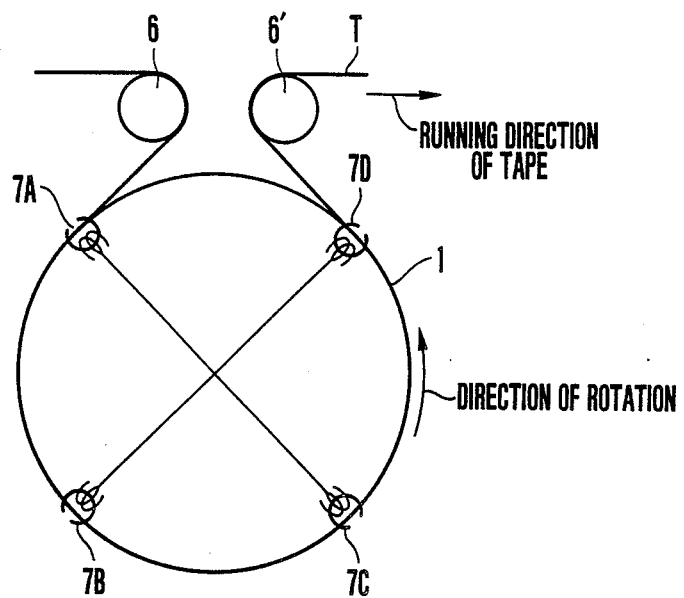
FIG. 5 is a schematic diagram illustrating the head arrangement of a first embodiment of the multi-channel recording apparatus according to the present invention.

In FIG. 5, a rotary drum 1 has n (in this instance, 4) magnetic heads 7A, 7B, 7C and 7D arranged along its peripheral edge in evenly spaced relation. A magnetic tape T is trained round the rotary drum 1 over an angular distance of more than 360°x(1-1/n) (in this instance, 270°) by loading posts 6 and 6'.

Figure 6:
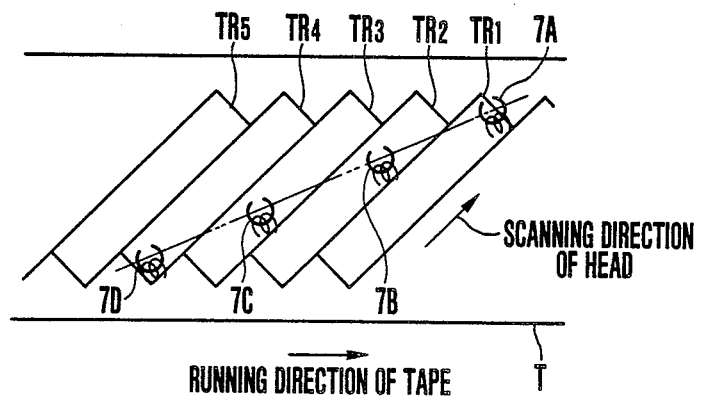
FIG. 6 is a plan view illustrating the track patterns formed by the aforesaid first embodiment.

Because of the configuration being as such, three out of the four magnetic heads 7A-7D are always in contact with the magnetic tape T during one revolution of the rotary drum 1. By allocating one channel of signals to the respective one of those of the magnetic heads which are in contact with the magnetic tape T, all the three channels of signals can be simultaneously recorded or reproduced as shown in FIG. 6. That is, at a point in time when the 1st magnetic head 7A has scanned the entire length of the 1st track $TR_1$, the 2nd one 7B is scanning at a position of having scanned ⅔ of the 2nd track $TR_2$, the 3rd one 7C at a position of having scanning ⅓ of the 3rd track $TR_3$, and the 4th one 7D reaches the scanning start position of the track $TR_4$. Therefore, suppose the 1st magnetic head 7A was recording or reproducing the 1st channel of signals on or from the 1st track $TR_1$, it is at the termination of its scanning operation that the 4th magnetic head 7D is switched to continue recording or reproducing the 1st channel of signals on or from the 4th recording track $TR_4$. Also, the 2nd magnetic head 7B records or reproduces the 2nd channel on or from the 2nd track $TR_2$, and the 3rd magnetic head 7C records or reproduces the 3rd channel on or from the 3rd track $TR_3$. And, at a point in time when the 2nd magnetic head 7B has completed the recording or reproducing of the 2nd channel on or from the 2nd track $TR_2$, the 1st magnetic head 7A is switched to start the subsequent recording or reproducing of the 2nd channel of signals on or from the 5th track $TR_5$. Also, at another point in time when the 3rd magnetic head 7C has completed recording or reproducing of the 3rd channel of signals the 2nd magnetic head 7B is switched to start the subsequent recording or reproducing of the 3rd channel of signal.

Figure 7:
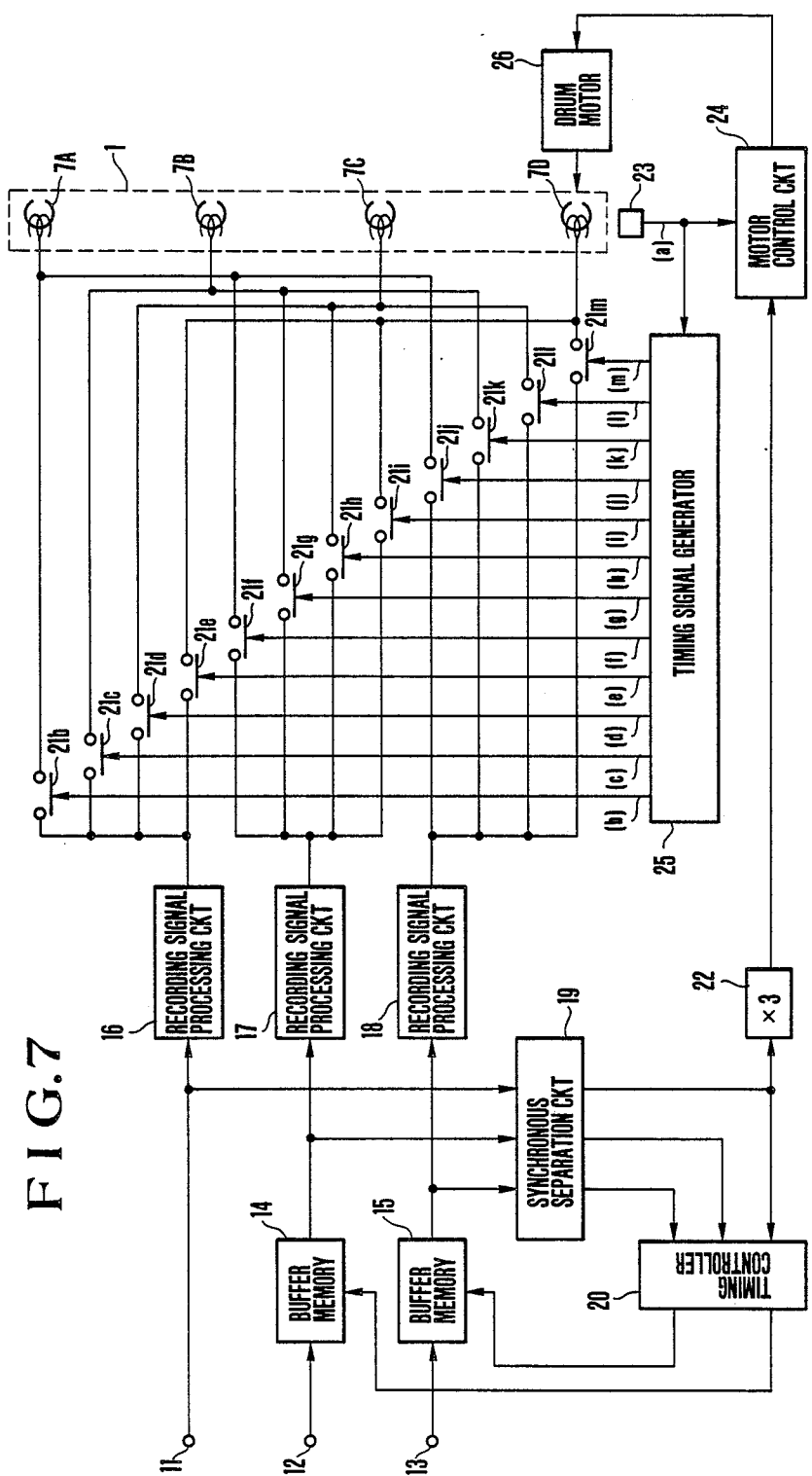
FIG. 7 is a diagram illustrating an example of the circuitry of the first embodiment.

FIG. 7 illustrates an example of the circuitry of the apparatus of the character described above, and FIG. 8 is a timing chart illustrating a manner in which the various portions of the circuit of FIG. 7 operate.

In FIG. 7, three flows of a signal, for example, video signal enter at respective terminals 11, 12 and 13. Now assuming that the vertical synchronous timings of these three flows of a video signal coincide with one another.

Buffer memories 14 and 15 perform delay of $\frac{1}{3}$ and $\frac{2}{3}$ vertical scanning periods respectively. These delay times can be adjusted by control signals produced from a timing controller 20. Supplied to the timing controller 20 are the vertical synchronous signals separated out from the video signals which have passed through the buffer memories 14 and 15 and the video signal directly from the terminal 11 by a synchronous separation circuit 19. So, the buffer memories 14 and 15 are controlled so that they differ 120° in phase from one another.

Recording signal processing circuits 16, 17 and 18 are receptive of the three flows of video signal with their vertical synchronous timings differing from each other by $\frac{1}{3}$ of the vertical scanning period for producing signals of suitable form to be recorded.

Figure 8:
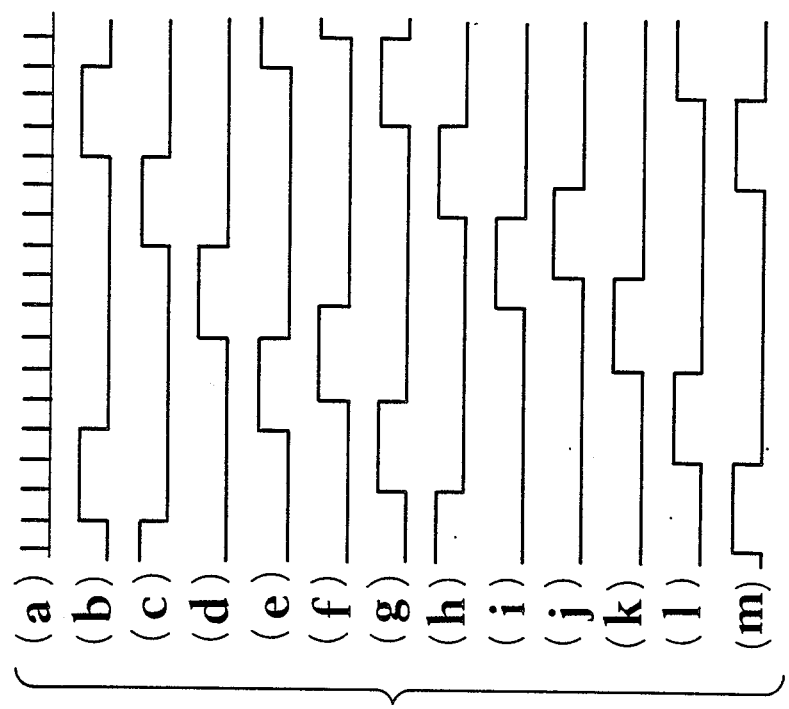
FIG. 8 is a timing chart illustrating a manner in which the various portions of FIG. 7 operate.

Switches 21b to 21m select three out of the four heads 7A, 7B, 7C and 7D for supply of the three flows of video signal produced from the circuits 16, 17 and 18 thereto, as their gatings are controlled by respective timing signals (shown on lines (b) to (m) in FIG. 8) produced from a timing signal generator 25. Thereby the heads 7A, 7B, 7C and 7D can record the three flows of signal as has been described above. Also, the recording positions of these vertical synchronous signals coincide with the lateral direction of the tape.

A detector 23 for detecting the phase of rotation of the rotary drum 1 produces a pulse signal (shown on line (a) in FIG. 8) with a frequency equal to 4 times the frequency of its rotation. This pulse signal is applied to the timing signal generator 25. Based on this phase detecting pulses (a), the timing signals (b)-(m) are formed. The rotation of the drum 1 is controlled by a control circuit 24 for a drum motor 26 in such a manner that the phase detecting pulses (a) and the output signal of a multiplier 22 representing 3 times the vertical synchronous signal of that video signal which enters at the terminal 11 fall in a prescribed phase relationship.

For note, in the case of reproduction too, the timing signals (b) to (m) may similarly be used for reproducing the video signal from all the heads 7A, 7B, 7C and 7D.

In such a way, in the above-described embodiment, the four magnetic heads 7A, 7B, 7C and 7D are brought selectively three at a time into contact with the magnetic tape T, while the selected three being successively allocated to the respective three flows of video signal, thereby it being made possible to perform recording or reproducing of the three flows of signal without suffering from dropping out.

Also, in case when the number of used magnetic heads is even as in this embodiment, the azimuth of the adjacent tracks formed on the magnetic tape T can be changed by changing the azimuth angle of the adjacent magnetic heads, thereby it being made possible to perform guard bandless high density recording.

Further, with the view of the ordinary apparatus for recording or reproducing one flow of signal in successive tracks, or the apparatus of the type in which the magnetic tape is trained 180° round the rotary drum having two magnetic heads when recording or reproducing is performed, if, in the above-described embodiment, the diameter of the rotary drum is multiplied by $(n+1)/2n$, the speed of rotation by $2n/(n+1)$, and the running speed of the tape by n (where is an odd integer of not less than 3), and the values of the parameters such as the azimuth of the magnetic heads and the track width are made equal to those of the ordinary apparatus, the multi-channel recording apparatus of the invention is made compatible with the above-cited ordinary or single-channel one. Moreover, there is an additional advantage that the reduction of the diameter of the rotary drum can contribute to a minimization of the size of the apparatus.

Another embodiment of the invention is next described by reference to FIGS. 9 to 13. For note, the head arrangement in this embodiment is assumed to be similar to that shown in FIG. 1.

Figure 9:
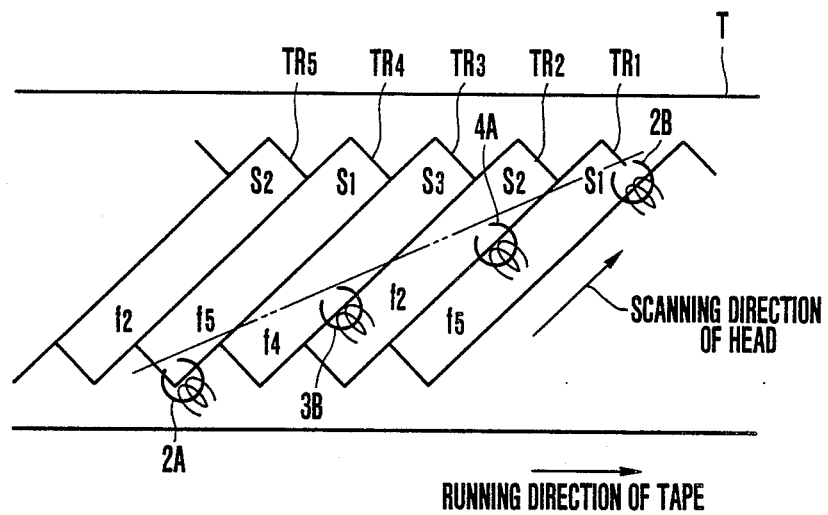
FIG. 9 is a plan view of the track patterns formed on a magnetic tape by a second embodiment of the multi-channel recording apparatus according to the invention.

FIG. 9 is a schematic view illustrating the track patterns formed on the magnetic tape T by the multi-channel recording apparatus of this embodiment. In the figure, $S_1$, $S_2$ and $S_3$ denote the signals of three channels recorded successively in tracks $TR_1$, $TR_2$, $TR_3$, $TR_4$, $TR_5$ and so on. $f_5$, $f_2$ and $f_4$ represent three pilot signals of different frequencies from one another.

As will be seen from FIG. 9, in this embodiment, the multi-channel recording apparatus operates in such a manner that when in a first mode where three flows of an information signal are simultaneously recorded, the three pilot signals $f_5$, $f_2$ and $f_4$ are allocated to, and superimposed on, the signals $S_1$, $S_2$ and $S_3$ respectively before they are recorded on the magnetic tape T by the respective magnetic heads. When in a second mode where only one flow of a signal is recorded, four pilot signals of different frequency are successively superimposed so as to form similar track patterns to those shown in FIG. 3 as in the prior art except that one pair of magnetic heads 2A and 2B are used alternatively to form all tracks $TR_1$, $TR_2$, $TR_3$ and so on successively.

It is also to be noted that for the first mode of simultaneous recording of the three flows of an information signal, two of the three pilot signals $f_5$, $f_2$ and $f_4$ to be recorded along with the information signals $S_1$, $S_2$ and $S_3$ in successive tracks, namely, the ones $f_2$ and $f_4$ should be the same in frequency as those used when in the second or single-channel recording mode.

Figure 10:
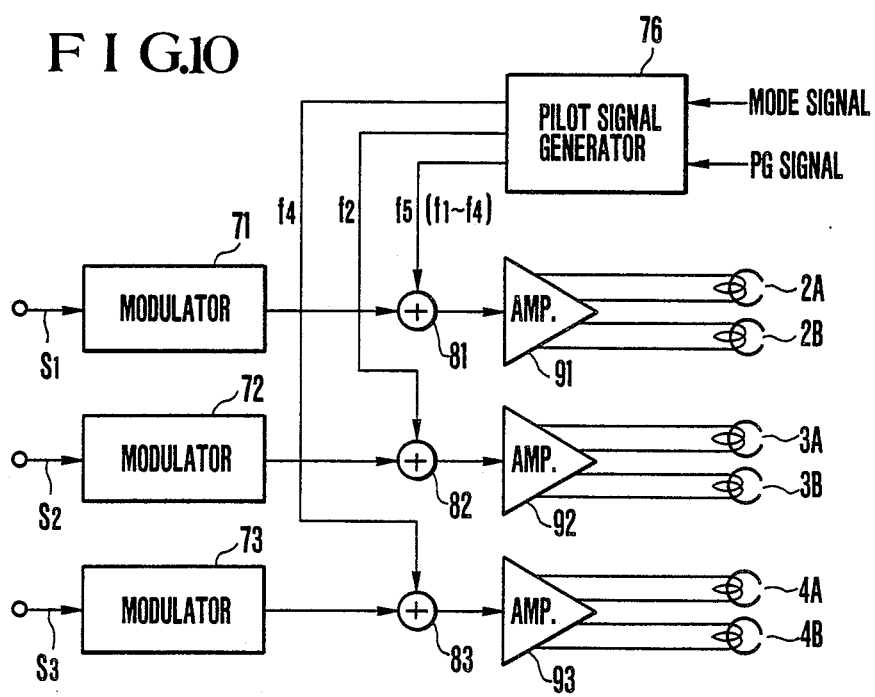
FIG. 10 is a block diagram illustrating the construction of the recording circuit of the second embodiment.

FIG. 10 is a block diagram illustrating the construction of a recording circuit for forming such recording patterns as described above.

This circuit is arranged to operate with selection of the single-channel and triple-channel recording modes by a mode signal from a mechanism (not shown) having an operating switch accessible from the outside of the apparatus. That is, responsive to the mode signal representing the triple-channel signal recording, a pilot signal generator 76 produces the aforesaid three pilot signals $f_5$, $f_2$ and $f_4$ for the tracking purpose simultaneously. The signals $S_1$, $S_2$ and $S_3$ of the three channels to be recorded are modulated to a prescribed recordable form by modulators 71, 72 and 73 respectively. The pilot signals $f_5$, $f_2$ and $f_4$ are then superimposed on the outputs of the modulators 71, 72 and 73 respectively by adders 81, 82 and 83. The outputs of the adders 81, 82 and 83 are applied through respective amplifiers 91, 92 and 93 to the three pairs of magnetic heads by which they are simultaneously recorded on the magnetic tape T.

Also, when another mode signal representing the single-channel recording enters the pilot signal generator 76, this generator 76 produces four pilot signals in sequence selectively depending on a PG signal representing the phase of rotation of the magnetic head 2A, 2B. The selected one of the pilot signals is mixed with the input signal $S_1$ before they are successively recorded by the magnetic head 2A, 2B. During this time, the other two pairs of magnetic heads 3A, 3B, and 4A, 4B are rendered inoperative by cutting off the power supply to the amplifiers 92 and 93, for example.

Figure 11:
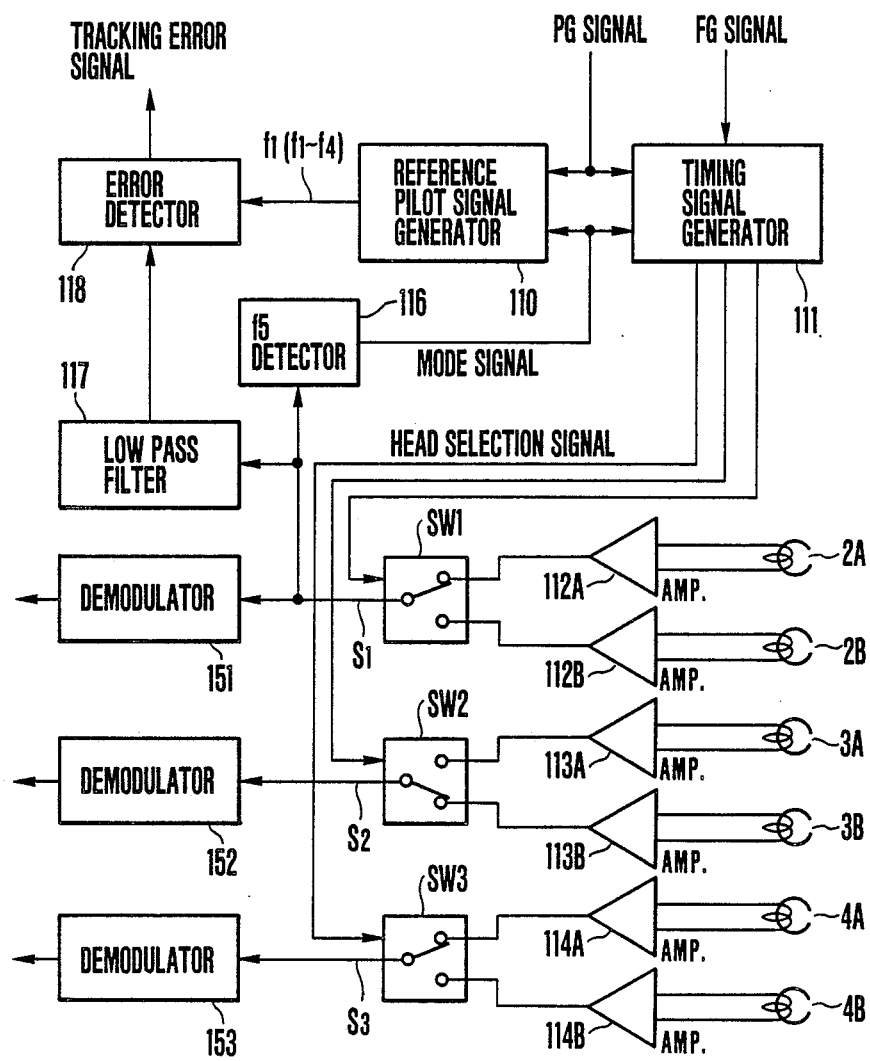
FIG. 11 is a block diagram illustrating the construction of a reproducing circuit for reproducing the signal recorded by the recording circuit of FIG. 10.
Figure 12:
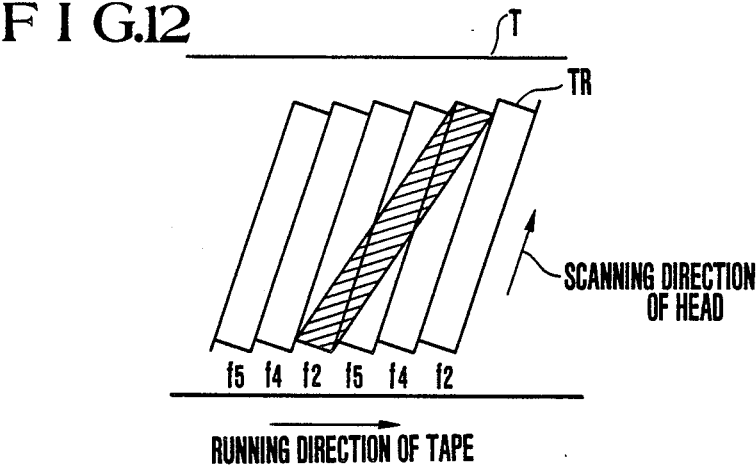
FIG. 12 is a plan view illustrating the scanning locus of the head on the tape when reproduced in a different mode from when was recorded.

FIG. 11 is a block diagram illustrating the construction of a reproducing circuit for reproducing the recorded signals by the above-described recording circuit.

Based on the PG signal and an FG signal obtained by detecting the phase and speed of rotation of the magnetic head 2A, 2B, a timing signal generator 111 produces three head selection signals for switches $SW_1$, $SW_2$ and $SW_3$. The reproduced signals from the magnetic heads 2A, 2B, 3A, 3B, 4A and 4B are applied to respective amplifiers 112A, 112B, 113A, 113B, 114A and 114B whose outputs are paired up and connected to the inputs of the switches $SW_1$, $SW_2$ and $SW_3$, becoming three flows of signal $S_1$, $S_2$ and $S_3$ These signals are then demodulated by demodulators 151, 152 and 153 before they are outputted.

Also, the one of these three flows of signal $S_1$, $S_2$ and $S_3$ which has been picked up by the magnetic head 2A, 2B is applied to an $f_5$ detector 116 and a low pass filter 117. In the $f_5$ detector 116, whether or not the pilot signal $f_5$ for tracking which was recorded by the magnetic head 2A, 2B when in the triple-channel recording mode is included in the input signal is examined. Therefore, if it is determined that the pilot signal $f_5$ is included, it can be found that the signal being reproduced at present is the triple-channel simultaneously recorded one. Also, if it is determined that it is not included, it can be found that it is the one that was recorded in the mode of recording only one flow.

And, that discrimination result is sent as a mode signal to a reference pilot signal generator 110. In the reference pilot signal generator 110, if the mode signal is a signal representing the simultaneous recording of the three flows of signal, a reference pilot signal $f_1$ is generated. If it is another signal representing the one-channel simultaneous recording, four pilot signals $f_1$ to $f_4$ are sequentially generated in synchronism with the PG signal. The output of the generator 110 is applied to an error detector 118.

Meanwhile, the low pass filter 117 extracts the reproduced pilot signal from the signal taken out by the magnetic head 2A, 2B and sends it to the error detector 118. Using this reproduced pilot signal and the aforesaid reference pilot signal or signals, the error detector 118 produces an output representing a tracking error of the magnetic head. In more detail, when that area of the tape T which was recorded in the triple-channel simultaneous recording mode is to be reproduced, the tracking error signal is formed by comparing the frequency components of the differences between the reproduced pilot signals $f_2$ and $f_4$ taken out by the low pass filter 117 and the pilot signal $f_1$ from the reference pilot signal generator 110. Also, when that area of the tape T which was recorded in the one-channel recording mode is to be reproduced, the tracking error signal is outputted by the prior known method using the reproduced pilot signals $f_1$–$f_4$ from the low pass filter 117 and the reference pilot signals $f_1$–$f_4$.

Figure 13:
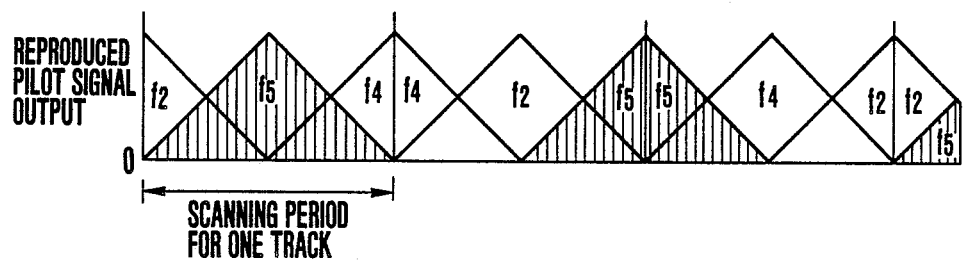
FIG. 13 is a diagram illustrating the reproduced pilot signals as the scanning is made along the locus of FIG. 12.

By the way, if the running speed of the magnetic tape is made the same between when in the one-channel signal recording mode and when in the triple-channel signal recording mode, their track pitches differ 3 times from each other. In order to make them almost equal to each other, it is necessary to increase the tape speed 3 times when in the triple-channel mode. In this case, if the magnetic tape on which the three channels of signal were recorded is reproduced in the one-channel mode, the locus of the magnetic head relative to each track TR becomes like that shown by a hatched part in FIG. 12. Therefore, the reproduced pilot signals at its output change their levels as shown in FIG. 13. As can be understood from this graph, owing to the fact that a pilot signal $f_5$ having two peaks per three tracks is produced, the $f_5$ detector 116 of FIG. 11 can be constructed with a peak hold circuit, an integration circuit and others.

In such a way, according to the tracking method in the above-described embodiment, it is made possible to discriminate which area of the tape, the simultaneous triple-channel recorded one, or the one-channel recorded one, is at present being reproduced. Based on this discrimination result, the control of the tape running speed and the selection of the magnetic head to be used can be made. None the less, because only one pilot signal is superimposed on each of the flows of information signal to be recorded, it is possible to correct the tracking error by a circuit of simple structure, while still permitting an accurate tracing of the magnetic head on the track to be achieved.

For note, though, in the above-described embodiment, the recording pilot signals to be used when in the simultaneous triple-channel record mode are made selected as $f_5$, $f_2$ and $f_4$, and the reference pilot signal to be used in the reproduction mode is made selected as $f_1$, the combination of these signals may be changed to either $f_5$, $f_4$ and $f_2$ with $f_3$, or $f_5$, $f_1$ and $f_3$ with $f_4$, or $f_5$, $f_3$ and $f_1$ with $f_2$. Even with this modification, it is possible to obtain a tracking error signal with an equivalent result.

Also, instead of the pilot signal $f_5$, one of the reference pilot signals may be used. In this case, when in the triple-channel record mode, one of the pilot signals $f_1$–$f_4$ will not be recorded. For example, in FIG. 9, the pilot signal $f_5$ is replaced by the $f_1$, the $f_3$ is not recorded. Therefore, when in reproduction, the discrimination of the record mode can be carried out by testing if the $f_3$ is present.

In the embodiment described above with reference to FIG. 9 to FIG. 13, the head arrangement of FIG. 1 is taken as the premise. Yet, in application to the apparatus having the head arrangement of FIG. 5, a similar recording, reproducing and discrimination of the record modes are possible to perform provided that the switches 21b–21m and heads 7A, 7B, 7C and 7D shown in FIG. 7 are put into the rear stages of the adders 81, 82 and 83 of FIG. 10 and in the front stages of the demodulators 151, 152 and 153 of FIG. 11. In this case, too, because when in the triple-channel record mode, all the three flows of signal to be recorded each are given a respective one of the pilot signals of different frequency to be superimposed, the structure of a circuit for superimposing the pilot signals takes a very simple form.

Still another embodiment of the invention is next described by reference to FIG. 14 to FIG. 19(B). The same reference characters have been employed in FIGS. 14–16 to denote the similar constituent elements to those shown in FIG. 9 to FIG. 11.

Figure 14:
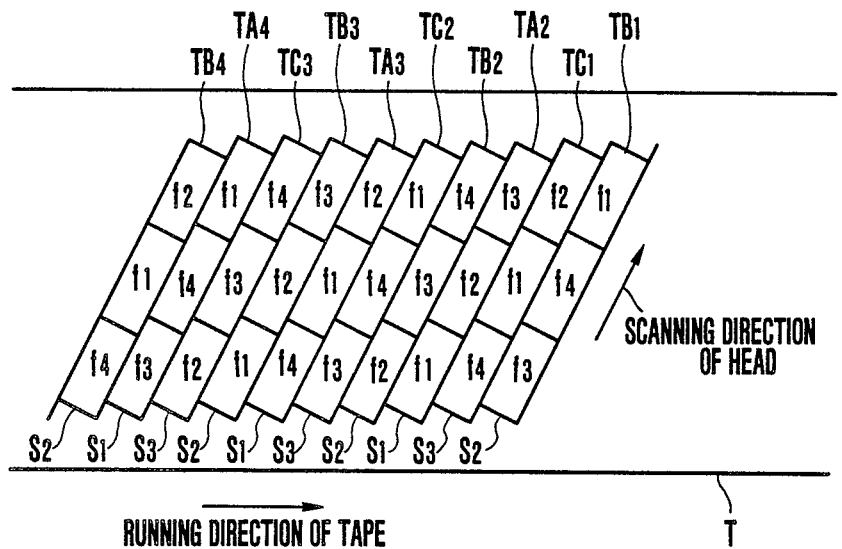
FIG. 14 is a plan view illustrating the track patterns on the tape according to a third embodiment of the invention.

FIG. 14 is a schematic diagram illustrating the track patterns formed on the magnetic tape T as the three flows of a signal are simultaneously recorded by a multi-channel recording apparatus of this embodiment. In the figure, $S_1$, $S_2$ and $S_3$ denote the information signals of the three channels recorded on the successive recording tracks $TA_1$, $TB_1$ $TC_1$ $TA_2$, $TB_2$, $TC_2$, and so on respectively. $f_1$, $f_2$, $f_3$ and $f_4$ represents respectively four pilot signals of different frequencies from one another.

As shown in FIG. 14, three out of the four pilot signals are recorded successively in three equally divided parts of each of the tracks. Moreover, there is another feature that the relationship of the frequencies of the two of the pilot signals which are recorded in the adjacent parts across track is similar to that of the frequencies in the adjacent tracks shown in FIG. 3. For example, in the track $TA_2$ shown in FIG. 14, with a remark to its upper part in which the pilot signal $f_3$ is recorded, what are recorded in its left and right hand side upper parts are the pilot signals $f_4$ and $f_2$ respectively. Similarly to it, in FIG. 3, what are recorded in the left and right hand side tracks of the track $TR_3$ having the pilot signal $f_3$ recorded therein are the pilot signals $f_4$ and $f_2$ respectively. This implies that even for the track patterns shown in FIG. 14, a similar tracking control to that in the case of FIG. 3 can be made.

In order to form such track patterns, it is in the head arrangement as shown in FIG. 5 or FIG. 1 that the three of the magnetic heads which are performing simultaneous recording of the three flows of signal $S_1$, $S_2$ and $S_3$ are supplied with the pilot signal of the same frequency, and this frequency is changed in the order of $f_1$, $f_2$, $f_3$ and $f_4$, while the period of recording each of the pilot signals is equalized to the difference between the timings of formation of the successive tracks.

FIG. 15 is a block diagram illustrating the construction of a recording circuit for forming the above-described recording patterns. For note, in this example, the head arrangement is assumed to be identical with that shown in FIG. 11.

The PG and FG signals representing the phase and speed of rotation of the magnetic head enter a timing signal generator 86. Based on these signals, a selection control signal Ss of such a frequency as to recycle the changing-over 6 times a revolution of the magnetic head is generated. This selection control signal Ss when in the triple-channel record mode, is applied directly to a pilot signal generator 88 by a switch 87. Depending on this signal Ss, four pilot signals $f_1$-$f_4$ are produced in sequence. These pilot signals are, similarly to the foregoing embodiment, mixed respectively with the three flows of an input signal $S_1$, $S_2$ and $S_3$ past the modulators 71, 72 and 73 by the adders 81, 82 and 83 before they are supplied through the amplifiers 91, 92 and 93 to the magnetic heads 2A, 3B and 4A, or 2B, 3A and 4B, being simultaneously recorded on the magnetic tape T.

Figure 3:
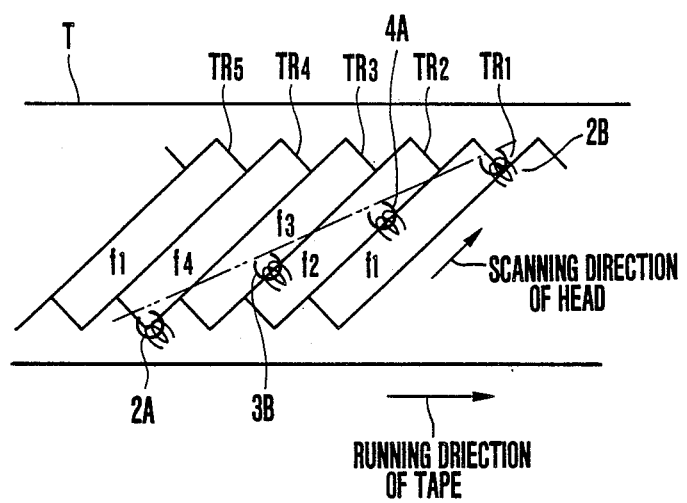
FIG. 3 is a plan view of an example of the recording patterns of tracking control pilot signals.
Figure 4:
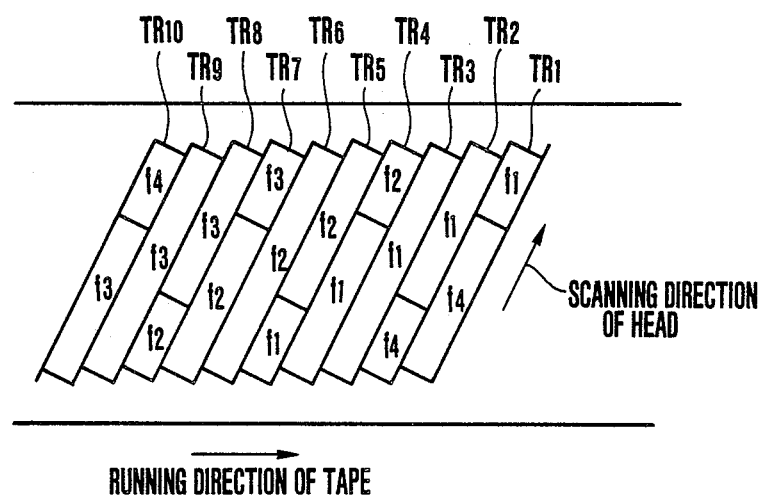
FIG. 4 is a plan view of another example of the recording patterns of tracking control pilot signals.

Meanwhile, when in the one-channel record mode, the switch 87 is changed over to direct the selection control signal from the timing signal generator 86 to a frequency divider 89 by which the frequency is reduced to ⅓. Therefore, the changing over is recycled 2 times a revolution of the drum. Responsive to the output of the frequency divider 89, the pilot signal generator 88 produces the four pilot signals $f_1$-$f_4$ in sequence to the adder 81 where it is mixed with the one flow of modulated signal $S_1$. The mixture is recorded through the amplifier 91 on the magnetic tape T. At this time, the other amplifiers 92 and 93 are rendered inoperative to shut off the recordings by the heads 3A, 3B, 4A and 4B. Thus, the track patterns shown in FIG. 3 are formed.

Figure 16:
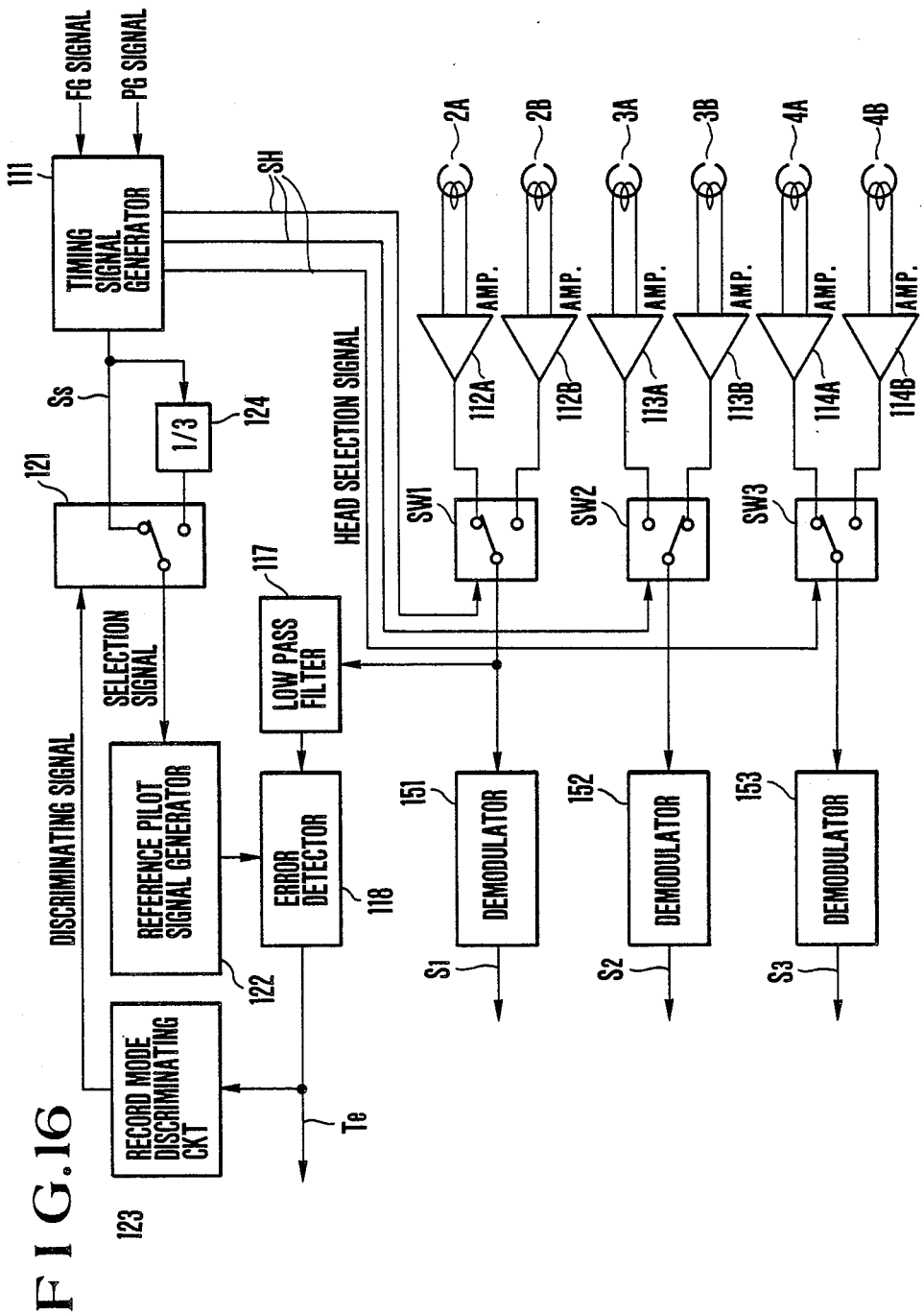
FIG. 16 is a block diagram illustrating the construction of a reproducing circuit for reproducing the signal recorded by the recording circuit of FIG. 15.
Figure 19:
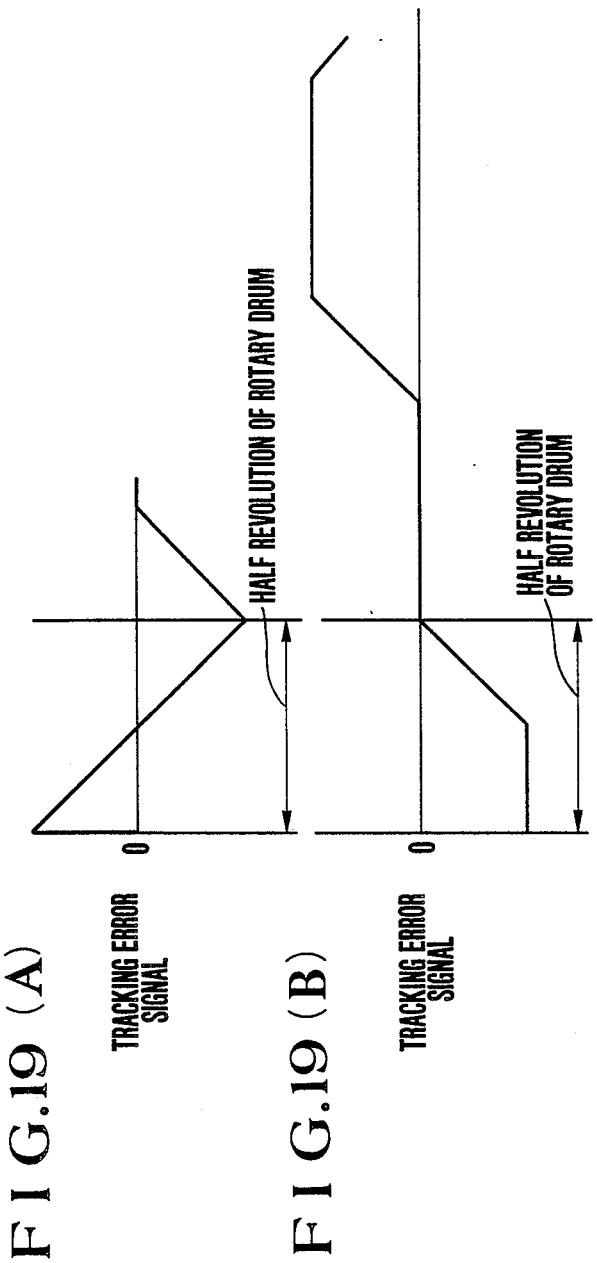

FIG. 16 is a diagram illustrating the construction of a reproducing circuit for reproducing the signals recorded by the above-described recording circuit.

In the figure, a timing signal generator 111 produces three head selection signals $Sh_1$, $Sh_2$ and $Sh_3$ of shifted phases by 60° from each other and a selection control signal Ss having such a frequency as to recycle the changing over 6 times a revolution of the drum 1, depending on the FG signal and PG signal. Switches SW1, SW2 and SW3 change their switched positions in response to these head selection signals Sh so that three magnetic heads are selected out of the six magnetic heads 2A, 2B, 3A, 3B, 4A and 4B to simultaneously take out the three flows of signal. They are sent through amplifiers 112A-114B and the switches SW1, SW2 and SW3 to the demodulators 151, 152 and 153 where they are demodulated before outputted. Also, the one of the three flows of signal which is taken out from the magnetic head 2A, 2B is routed from the switch SW1 to a low pass filter 117 where the reproduced pilot signal is separated out. It is then applied to the error detector 118. Meanwhile, the selection control signal produced from the timing signal generator 111 when in the triple-channel mode is applied directly to a reference pilot signal generator 122 by a switch 121. Responsive to this signal, the generator 122 produces four reference pilot signals $f_1$-$f_4$ which are applied to the error detector 118. In the error detector 188, as is well known, the level of the cross talk component from both of the adjacent tracks included in the reproduced pilot signal is compared with the signal level computed on the basis of the aforesaid reference pilot signal, and a tracking error signal Te is sent out. And, this tracking error signal is inputted to a tape speed control device (not shown), thereby the running of the tape is controlled in such a manner that the magnetic head traces the track accurately.

Also, the tracking error signal Te is applied to a record mode discriminating circuit 123. And, based on this tracking error signal, the discriminating circuit 123 performs determination of whether that area of the tape which is at present being reproduced has the recorded signal of one channel, or of three channels, and produces a discriminating signal representing either of the record modes which is then applied as a control signal to the switch 121. Responsive to this discriminating signal, the switch 121 changes its position to change the frequency of the selection control signal Ss with the help of the frequency divider 124.

Next, the discriminating operation of the aforesaid record mode discriminating circuit is explained by reference to FIGS. 17(A), 17(B), 17(C) and FIGS. 18(A), 18(B), 18(C). For note, the following is described on assumption that the tape running speed when in the triple-channel record mode was made equal to 3 times that when in the one-channel record mode so that the track pitches were almost equalized.

FIG. 17(A) illustrates a locus of the magnetic head on that area of the tape which was recorded in the one-channel mode when the tape runs at a speed for the triple-channel reproduction mode. In this case, the reproduced pilot signals have their waveforms to vary with respect to the period of production of each reference pilot signal so that the tracking error signal takes a waveform as shown in FIG. 18. For the illustrated case, there is no DC component in the tracking error signal. But even in a case when the locus of the magnetic head deviates, because a DC component of the corresponding magnitude to the deviation is formed, stability is established in the illustrated state. In such a manner, the tracking error signal eventually gets a constant pattern with large amplitudes. Hence, this signal is permitted to be used for discriminating one record mode from the other with high accuracy and reliability. For this purpose, the tracking error signal is, for example, compared with such a reference signal as shown in FIG. 17(C) to obtain six pulses a revolution of the drum 1. By using these pulses, that the record mode and the reproduction mode do not coincide with each other can be determined.

Conversely to the above-described case, when that area of the tape which was recorded in the triple-channel mode is made to run at a speed for the one-channel reproduction mode, the locus of the head, the waveforms of the reproduced pilot signals, the waveform of the tracking error signal and the output of the discriminating circuit are caused to change as shown in FIGS. 18(A), 18(B) and 18(C). In this case, the tracking error signal has its polarity in the inverted form of the case of FIG. 17(B). Hence it can be used for determining that the record mode and the reproduction mode do not coincide with each other in the number of channels.

Also, if either of the one-channel and triple-channel reproduction modes has different speeds of the tape, the waveform of the tracking error signal varies in different ways. The discrimination of the tape modes can also be made.

For example, a case where, besides the normal tape mode, there is another tape mode in which the speed of the tape is 3 times that of the normal mode, is shown in FIGS. 19(A) and 19(B). That is, when that area of the tape which was recorded in the one-channel mode at the slow tape speed is reproduced in a faster tape speed, the tracking error signal varies with time as shown in FIG. 19(A). Conversely when that area of the tape which was recorded at the normal tape speed is reproduced at a slower tape speed, it becomes as shown in FIG. 19(B). Since, in either case, the period of variation of the tracking error signal differs from any of those of the cases of FIGS. 17(B) and 18(B), it is possible to discriminate the tape speeds in the record mode when in reproduction.

For note, in the above-described embodiment, it is also considered that there is another case where the three input flows when recording do not correspond to the three input flows when reproducing. To make both flows to correspond, the changing-over due to the selection control signal shown in FIG. 16 should be removed, thereby it being made possible to correspond each flow. Also, in the case of the signal in the form of digital data, each flow can be made to correspond by using the code of the signal flow number or the like.

Also, though, in FIG. 16, there has been shown the case of extracting the reproduced pilot signal from the signal of only one output flow to obtain the tracking error signal, the signals of all the three flows $S_1$, $S_2$ and $S_3$ may be used in extracting the pilot signals to form respective tracking error signals which are then used in mixture to control the speed of the tape or the like. Further, the signals of the three flows may otherwise be selected in sequence to take out the pilot signals which are then used to form a tracking error signal.

Further, though, in FIGS. 17(A)–17(C) and 18(A)–18(C), the head width has been illustrated as being equal to any of the track pitches, it is of course possible to use a different head width from any of the track pitches. Even in such a case, the tracking error can be detected, and the record mode in the area being reproduced can be discriminated.

In such a manner, in the embodiment described by using FIGS. 14–19(B), even when in the multi-channel recording, the signal superimposed on the signals of all the flows to be recorded becomes the same pilot signal. Hence, the generating pattern of the pilot signal may be prepared in only one flow. For this reason, the circuit structure becomes very simple.

For note, the description using FIGS. 14–19(B) has the premise of the head arrangement of FIG. 1. Yet, in the case of the apparatus having the head arrangement of FIG. 5, the rear stage of the adders 81, 82 and 83 of FIG. 15 and the front stage of the demodulators 151, 152 and 153 of FIG. 16 should be provided with the switches 21b–21m and the heads 7A, 7B, 7C, 7D shown in FIG. 7 in order to make possible a similar recording or reproducing. In this case, too, the pilot signal may be superimposed in the same pattern on the signal of each flow to be recorded. Therefore, the circuit can be constructed in simple form.

Figure 20:
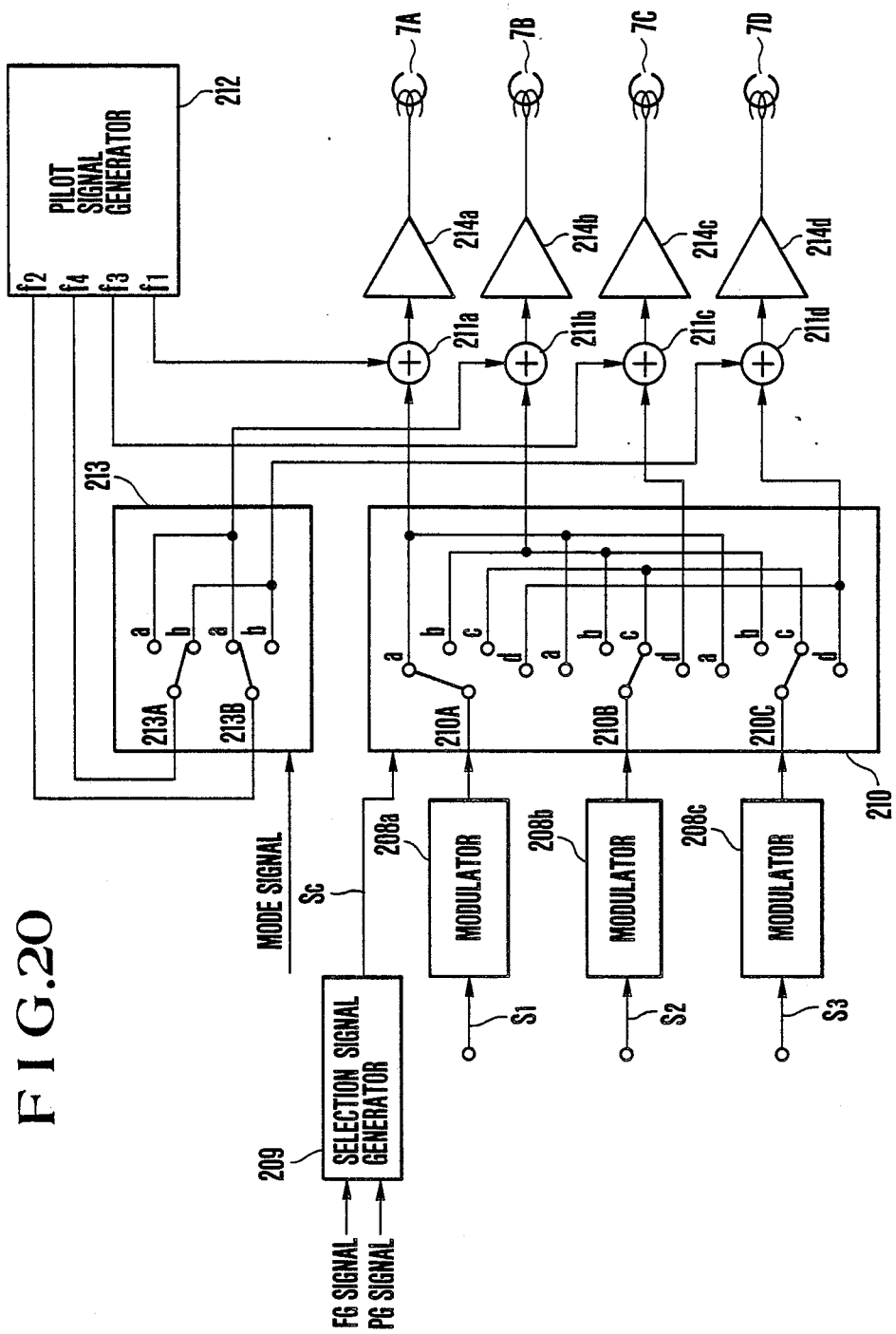
FIG. 20 is a block diagram illustrating the construction of a fourth embodiment of the recording circuit according to the present invention.

A further embodiment of the invention is next described by using FIG. 20 to FIG. 24. FIG. 20 is a diagram illustrating the construction of a recording circuit for simultaneously recording the signals of three channels on the magnetic tape T by using the heads 7A, 7B, 7C and 7D arranged as shown in FIG. 5.

The circuit of FIG. 20 includes modulators 208a, 208b and 208c for the signals of the three channels $S_1$, $S_2$ and $S_3$ respectively, a selection signal generator 209 receptive of the FG and PG signals representing the speed and phase of rotation of the rotary drum 1 for producing a head selection signal Sc, a switch circuit 210 responsive to the head selection signal for selectively connecting the outputs of the modulators 208a, 208b and 208c to adders 211a, 211b, 211c and 211d, and a pilot signal generator 212 for producing m pilot signals of different low frequencies (where m is a divisor of (n+1) except 1). Since, as has been described above, the number of channels in recording the signals is taken at 3, it is in this instance that as the divisor of $m=3+1$, use is made of 4 or four pilot signals $f_1$, $f_2$, $f_3$ and $f_4$ to be applied to the adders 211a, 211b, 211c and 211d. For note, the values of the four pilot signals are chosen as desirable, being, for example, $f_1=102.544$ KHz, $f_2=118.95$ KHz, $f_3=165.210$ KHz and $f_4=148.689$ KHz. The recording circuit further includes a pilot signal selection circuit for selectively applying the pilot signals $f_2$ and $f_4$ to the adders 211b and 211d depending on the mode signal at its control input, and amplifiers 214a, 214b, 214c and 214d for amplifying the mixed signals of the 3-channel signals $S_1$, $S_2$ and $S_3$ and the pilot signals by the adders 211a, 211b, 211c and 211d respectively, their outputs being supplied to the magnetic heads 7A, 7B, 7C and 7D respectively.

The recording circuit of such construction operates as follows: At first, a case of recording the signal of only one channel, say, $S_1$ is explained. In this case, depending on the head selection signal Sc from the selection signal generator 209, the pole 210A in the switch circuit 210 is moved across throws, a, b, c and d, successively in each period equal to ¾ revolutions of the rotary drum 1 so that the 1-channel signal $S_1$ after having passed through the modulator 208a is applied selectively to the adders 211a, 211b, 211c and 211d successively. In the meantime, the pilot signal selection circuit 213 responsive to the mode signal representing the 1-channel recording sets its movable poles 213A and 213B in contact with their throws, b and a, respectively. Therefore, the pilot signals $f_1$, $f_2$, $f_3$ and $f_4$ produced from the pilot signal generator 212 are mixed with the signal $S_1$ of the one channel by the adders 211a, 211b, 211c and 211d respectively. Then, these mixed signals after having been amplified by the amplifiers 214a, 214b, 214c and 214d respectively are recorded from the magnetic heads 7A, 7B, 7C and 7D onto the magnetic tape T in successive tracks as shown in FIG. 21. For this case, all the tracks $T_1, T_2, \ldots$ each have one of the pilot signals $f_1, f_2, f_3$ and $f_4$ in this order with this sequence being recycled.

Figure 23:
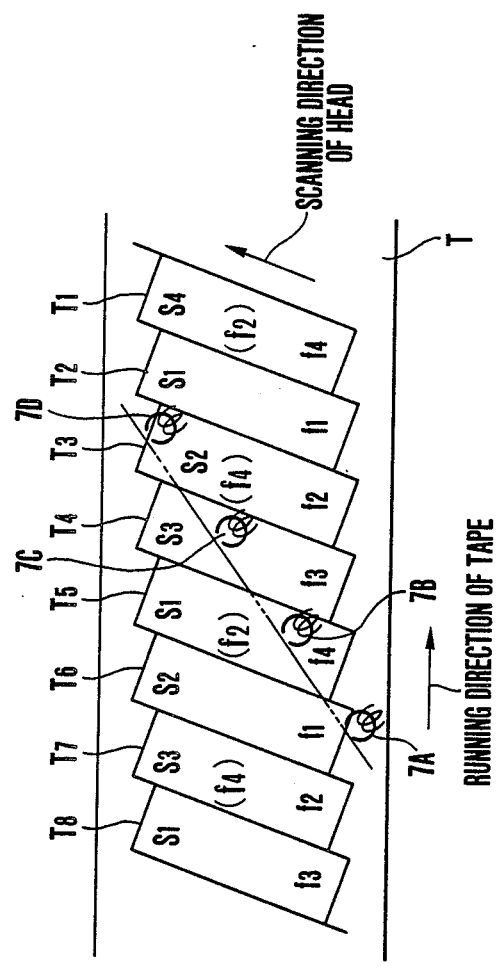
FIG. 23 is a plan view illustrating another recording patterns on the magnetic tape by the apparatus of FIG. 20.

Next explanation is given to another case where the 3-channel signals are recorded, and its operation. For this case, the speed of movement of the magnetic tape T becomes 3 times that of the 1-channel record mode, and the pilot signal selection circuit 213 changes the positions of the poles 213A and 213B to the throws, a and b, respectively. Also, in the switch circuit 210, all the poles 210A, 210B and 210C are moved each across its throws, a, b, c and d, in sequence, depending on the head selection signal Sc. The period for which one pole is contacting with each throw is equal to that necessary for the rotary drum 1 to rotate $\frac{3}{4}$ revolutions, and recycled with an interval of $\frac{1}{4}$ revolution. Therefore, the signals of the three channels $S_1$, $S_2$ and $S_3$ past the modulators 208a, 208b and 208c are selectively applied one at a time to the adders 211a, 211b, 211c, and 211d successively. In the meantime, all the adders 211a, 211b, 211c and 211d are supplied with the pilot signals $f_1, f_4, f_3$ and $f_2$ respectively. The four mixed signals with the aforesaid signals of the three channels are then amplified by the amplifiers 214a, 214b, 214c and 214d and then supplied to the magnetic heads 7A, 7B, 7C and 7D respectively, thus being recorded on the magnetic tape T. How the signals of the three channels $S_1$, $S_2$ and $S_3$ each are recorded with selection of the magnetic heads 7A, 7B, 7C and 7D in what timed relationship to each other is shown in FIG. 22. What combination of the signals $S_1$, $S_2$ and $S_3$ with the pilot signals is recorded in each of the tracks $T_1, T_2, T_3$ and so on is shown in FIG. 23. In this figure, $f_1, f_2, f_3$ and $f_4$ represent those pilot signals which were recorded with the poles 213A and 213B of the selection circuit 213 as switched from the 1-channel mode, and ($f_2$) and ($f_4$) represents those pilot signals $f_2$ and $f_4$ which would have been recorded when the selection circuit 213 is left unchanged from the position for the 1-channel mode. In other words, if, when in the 3-channel mode, the pilot signals are applied in the order of $f_1, f_2, f_3$ and $f_4$ to the adders 211a, 211b, 211c and 211d, the order in which the pilot signals are actually recorded in the successive tracks on the magnetic tape T would be reverse to that when in the 1-channel mode. For this reason, in this embodiment, use is made of the selection circuit 213 to exchange the pilot signals $f_4$ and $f_2$ with the result that the sequence of the recorded pilot signals when in the 3-channel mode is identical to that when in the 1-channel mode. If this measure is not required, the above-identified selection circuit 213 should be omitted.

Figure 24:
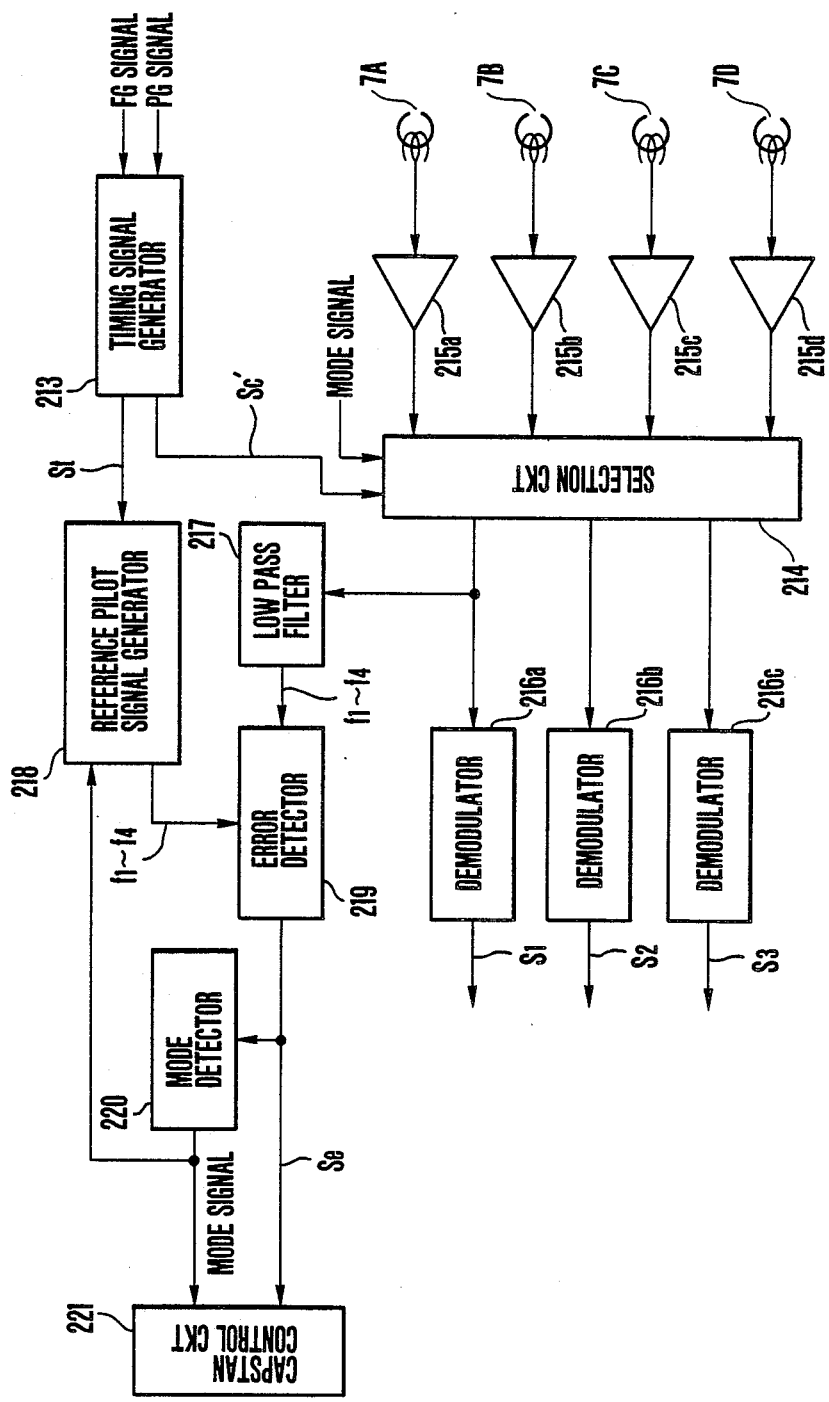
FIG. 24 is a block diagram illustrating the construction of a circuit for reproducing the signal recorded by the circuit of FIG. 20.

FIG. 24 is a diagram illustrating the construction of a reproducing circuit for the recorded signal by the above-described recording circuit.

The circuit of FIG. 24 comprises a timing signal generator 213 receptive of the FG and PG signals for producing a head selection signal S'c, and a timing signal St, a head selection circuit 214 responsive to the head selection signal S'c and the mode signal for selectively applying the four reproduced signals from the magnetic heads 7A, 7B, 7C and 7D past respective amplifiers 215a, 215b, 215c and 215d as 3-channel signals to demodulators 216a, 216b and 216c, its internal structure being similar to that of the head selection circuit 210, a low pass filter 217 for extracting a pilot signal of low frequency out of the signal of the 1st channel produced from the head selection circuit 214, a reference pilot signal generator 218 responsive to the timing signal St from the timing signal generator 213 for producing reference pilot signals $f_1, f_2, f_3$ and $f_4$, a tracking error detector 219 for detecting a tracking error signal Se of the reproducing magnetic head based on the reference pilot signals and the reproduced pilot signals, and a mode detector 220 for determining whether the area to be reproduced was recorded in the 1-channel or 3-channel mode based on the tracking error signal Se. The output of this or mode detector 220 is fed back to the reference pilot signal generator 218 and the head selection circuit 214, and also applied to a capstan control circuit 221 and other control systems.

Based on the above-described features, the reproducing operation is next described.

When that area of the tape which was recorded in the 1-channel mode, or which has such track patterns as shown in FIG. 21, is to be reproduced, the operation of the head selection circuit 214 is controlled by the head selection signal S'c from the timing signal generator 213 in such a manner that the signals picked up from the tracks, say, $T_4$ to $T_7$ by the respective magnetic heads 7A, 7B, 7C and 7D appear in series at the 1st output of the circuit 214 which is connected to the input of the 1st demodulator 216a. Also, at the same time, the low pass filter 217 separates the reproduced pilot signals $f_1, f_2, f_3$ and $f_4$ out of the first output of the head selection circuit 214. Then, in the error detector 219, the reproduced pilot signals and the reference pilot signals are used to form a tracking error signal representative of the tracking error amount by the 4-cycle method. Based on this, a capstan (not shown) is controlled by the capstan control circuit 221 so as to adjust the running speed of the tape. In such a manner, the tracking control is made.

Also, when that area of the tape which was recorded in the 3-channel mode, or which has such track patterns as shown in FIG. 23, is to be reproduced, the manner in which the operation of the head selection circuit 214 is controlled is changed by the head selection signal S'c so that the signals of the 3-channel picked up by the three of the four magnetic heads 7A, 7B, 7C and 7D which come to contact with the magnetic tape T appear in parallel at the respective 1st to 3rd outputs of the selection circuit 214. These three outputs are then demodulated by the respective demodulators 216a, 216b and 216c. In the meanwhile, the 1st output for the 1st channel of the selection circuit 214 is applied to the low pass filter 217, thereby the reproduced pilot signals are separated out. Similar to the 1-channel mode, the tracking error detector 219 produces the tracking error signal Se. Responsive to this, the capstan control circuit 221 carries out the tracking correction. Also, the error signal Se is applied to the mode detector 220, where if, as the channel mode when in recording differs from that when in reproduction, the running speed of the tape differs, the tracking error signal will beat. By detecting this, the record mode of the area to be reproduced is determined. For note, the detection of the record mode of the area to be reproduced may otherwise be made by another method of inserting the mode signal into the digital signal when in recording, and detecting this mode signal when to reproduce.

This mode detection signal is used not only in the aforesaid head selection and the control of the reproduction system, but also for changing the order in which the reference pilot signals are produced successively. In more detail, assuming that the pilot signals to be reproduced in either of the 1-channel and 3-channel modes were recorded in the same order, then when the 3-channel reproduction mode is operated despite the 1-channel one should be, the order in which the pilot signals are reproduced is reversed. Therefor, there is need to change the order in which the reference pilot signals are produced. For example, when in the 3-channel record mode, if the pilot signals $f_4$ and $f_2$ are exchanged by the pilot signal selection circuit 213, the order in which the pilot signals are recorded becomes: $f_1 - f_2 - f_3 - f_4$. But, when in reproduction, as the reproducing heads are operated to pick up the tracks as the target to control, the pilot signals are reproduced from these picked-up tracks in the reversed order: $f_1 - f_4 - f_3 - f_2 - f_1$.

Hence, suppose when in the 1-channel reproduction mode, the reference pilot signals are generated in the order: $f_1 - f_4 - f_3 - f_2 - f_1$ and so on, then if the reproduced pilot signals are multiplied by them as is known in the art, a frequency component $f_A$ ($=f_2 - f_1 = f_3 - f_4$) is included in the one of these multiplied signals which is obtained always from the preceding track to the target track to control, and another frequency component $f_B$ ($=f_4 - f_1 = f_3 - f_2$) always from the next track. The tracking error signal is obtained by comparing these components $f_A$ and $f_B$. It should be noted in this connection that if it were in the 3-channel reproduction mode that the order of generation of the reference pilot signals is made as $f_1 - f_4 - f_3 - f_2 - f_1$ and so on, because the reproduced pilot signals from the target tracks are also in the same order, the polarities of the components $f_A$ and $f_B$ would alternate in every one track. From this reason, for the tracking error signal is formed by an identical circuit, the order of generation of the reference pilot signals in the 3-channel reproduction mode must be made to be $f_1 - f_4 - f_3 - f_2 - f_1$.

Also, in the case where the selection circuit 213 is not used, as has been described above, the pilot signals are recorded in the reversed order. For this case, the pilot signals reproduced from the tracks to which the heads for the 1st channel are adjusted are in the same order as that when in the 1-channel reproduction mode, but the polarities of the aforesaid components $f_A$ and $f_B$ are inverted. In this case, therefore, when the apparatus is switched to the 3-channel reproduction mode, the order of production of the reference pilot signals may be left unchanged, provided that the tracking error signal is inverted before it is supplied to the capstan control circuit 221.

According to the above-described embodiment described by using FIG. 20 to FIG. 24, for all the heads 7A, 7B, 7C and 7D, not only in the case when the information signal of only one channel is recorded, but also in the case when the information signals of the three channels are recorded, the pilot signals to be supplied to the respective individual heads are of only one frequency in each head. This enables a very great simplification of the structure of construction of the circuit to be achieved.

A furthermore embodiment of the invention is next described. In this embodiment, the multi-channel recording apparatus has a similar head arrangement with six rotary heads to that shown in FIG. 1, and a fixed head lying in a prescribed spatial relation to these rotary heads, the fixed head being arranged to record control signals along the vicinity of one side edge of a tape.

Figure 25:
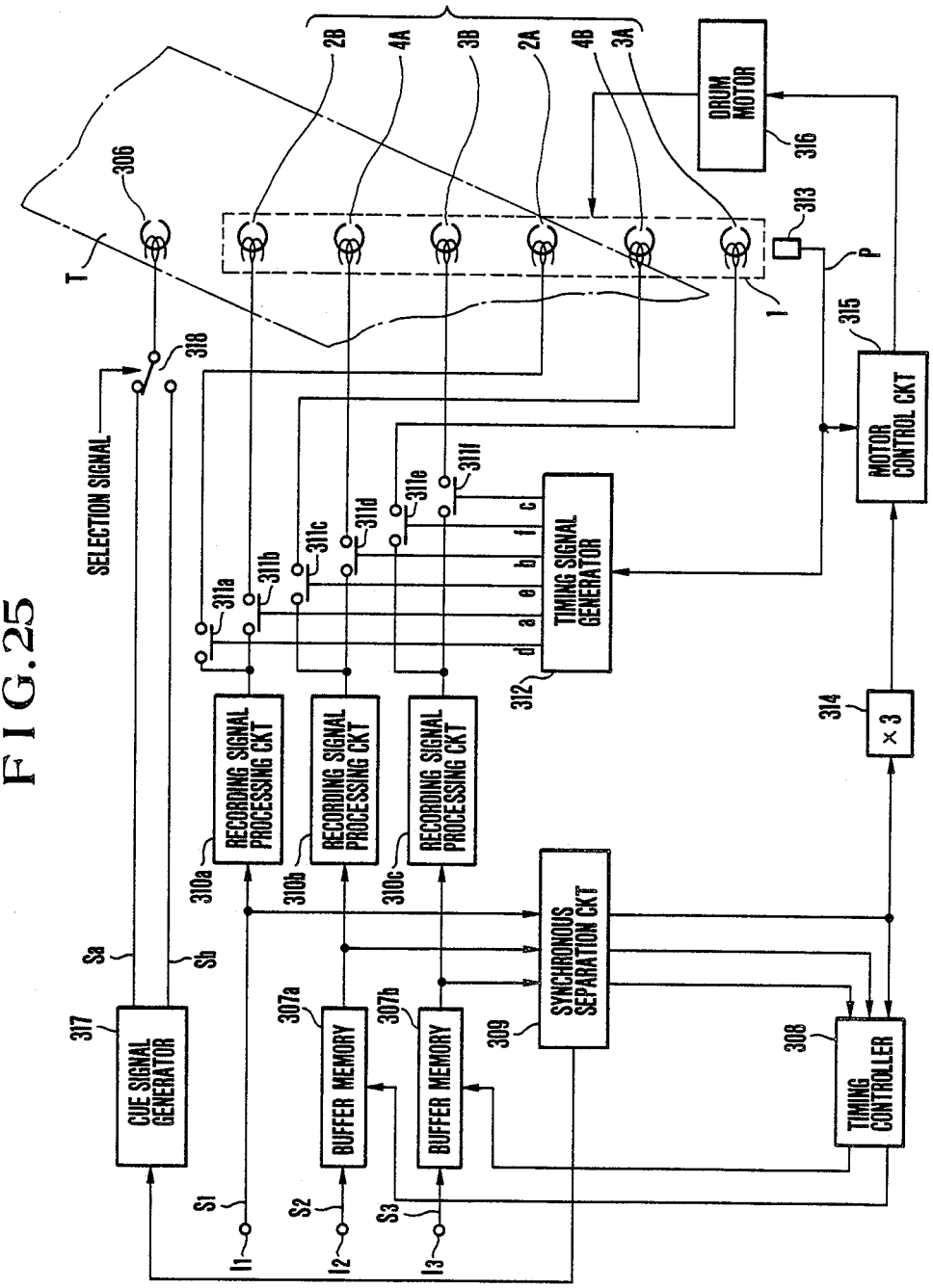
FIG. 25 is a block diagram illustrating the construction of a fifth embodiment of the multi-channel recording apparatus according to the present invention.

FIG. 25 is a diagram illustrating the construction of the multi-channel recording apparatus of this embodiment. In the figure, three channels of a signal, for example, video signal, $S_1$, $S_2$ and $S_3$ enter at inlets $I_1$, $I_2$ and $I_3$ respectively. The video signals of the three channels $S_1$, $S_2$ and $S_3$ are assumed here to be coincident in the vertical synchronous timing with one another. Buffer memories 307a and 307b have delay times equal to $\frac{1}{3}$ and $\frac{2}{3}$ of the vertical scanning period respectively. These delay times can be adjusted by a control signal produced from a timing controller 308. A synchronous separation circuit 309 receptive of the video signal $S_1$ directly from the inlet $I_1$ and the other two video signals $S_2$ and $S_3$ through the buffer memories 307a and 307b produces three vertical synchronizing signals which are then applied to the timing controller 308. The delay times of the buffer memories 307a and 307b are controlled so that the vertical synchronizing signals differ 120° in phase from each other. The three video signals of different vertical synchronous timings from each other by $\frac{1}{3}$ of the vertical scanning period are made suitable for recording by recording signal processing circuits 310a, 310b and 310c. The outputs of the signal processing circuits 310a, 310b and 310c are applied to the three of the six magnetic heads 2A to 4B which are selected by switches 311a to 311f; as the selected magnetic heads are in contact with the magnetic tape T. The operations of these switches 311a to 311f are controlled by respective timing signals (shown on lines, a to f ,in FIG. 26) produced from a timing signal generator 312. Thereby the rotary magnetic heads 2A to 4B are enabled to record the signals of the three channels as has been described before. Also, for this case, too, the recording positions of the vertical synchronizing signals coincide with the lateral direction of the tape. A detector 313 detects the phase of rotation of the rotary drum 1 and produces a pulse signal P (see FIG. 26) with a frequency equal to 6 times the frequency of rotation of the drum 1. This pulse signal P is supplied to the timing signal generator 312, in which based on this phase detection pulse P, the timing signals, a to f, are formed. The rotation of the rotary drum 1 is controlled by a control circuit 317 for a drum motor 316 in such a manner that the phase detection pulse falls in a prescribed relation with the output of a multiplier 314 which represents 3 times the vertical synchronizing signal of that video signal which entered at the inlet $I_1$. At the same time when the aforesaid three video signals are recorded, the fixed magnetic head is supplied with either one of two kinds of CUE signals Sa and Sb produced from a CUE signal generator 317 through a switch 318. This is formed as a linear control track TRc below the main tracks $TR_1$, $TR_2$, . . . in which the signals of the three channels $S_1$, $S_2$ and $S_3$ are recorded. These two kinds of CUE signals Sa and Sb are made to form depending on the vertical synchronizing signals separated out by the synchronous separation circuit 309. In this embodiment, for example, as shown on lines (A) and (B) in FIG. 27, they have rectangular waveforms of different frequencies from each other. Also, a switch 318 is arranged to change over in response to a control signal sent from a mode selector or like means accessible from the outside of the apparatus. Here, when in the 1-channel mode, the switch 318 is in a position where the CUE signal Sa shown on line (A) in FIG. 27 is supplied to the fixed head. When to the 3-channel mode, it takes another position where the CUE signal Sb shown on line (B) in FIG. 27 is supplied to the fixed head.

When reproducing the video signals, the CTL signal is also reproduced by the fixed head 306. Now assuming that the CUE signal which was recorded, for example, in the 1-channel mode is reproduced in the same mode, then the fixed head 306 produces an output signal whose waveform is shown on line (A') in FIG. 27. If the same signal is reproduced in the different or 3-channel mode, the output signal changes its waveform as shown on line (A") in FIG. 27. Alternatively assuming that the CUE signal which was recorded in the 3-channel mode is reproduced in the same mode, then the output signal has such a waveform a shown on line (B') in FIG. 27. If the same signal is reproduced in the different or 1-channel mode, the output signal changes its waveform as shown on line (B") in FIG. 27. In such a manner, when the channel mode when in reproduction does not coincide with that when in recording, the output signal of the fixed head differs in frequency from that when in coincidence. Also, depending on whether the record mode is in 1 or 3 channel or channels, the output signal is also differentiated in the waveform This makes it possible to easily discriminate in which channel mode the area being at present reproduced was recorded.

Another premise of the above-described embodiment is that the running speed of the tape when in the 3-channel mode is made equal to 3 times that of the tape when in the 1-channel mode. Even in application to an apparatus where the 1-channel mode operates with selection of the normal and 3 times-as-fast modes, it is possible, when to reproduce, to detect whether the record mode was in 1 channel or 3 channels. In more detail, even when in the 3 times faster speed mode, because the number of channels of video signal is one, the CUE signal shown on line (A) in FIG. 27 is recorded. If this signal is reproduced in the 1-channel mode at the 3 times faster speed, the output signal has the waveform shown on line (A') in FIG. 27. If the speed is changed to the normal one, the output signal takes such a waveform as shown on line (A''') in FIG. 27. This makes it possible to easily detect whether the area being at present reproduced was recorded in the 1-channel mode or in the 3-channel mode, and, at the same time, detect the running speed of the tape which was used when in recording. Therefore, even if the signals of different modes were recorded at random in one and the same tape, these modes can be discriminated from each other. Hence, the operation of the reproducing circuit can automatically be controlled in accordance with the output of the mode discriminator.

A further feature of this embodiment is that the CUE signal to be used when in the 1-channel record mode is in the form of a rectangular wave whose duty ratio is 50% and which recycles in every two tracks in synchronism with each revolution of the rotary magnetic head. Hence, when in reproduction, to bring the rotary head into alignment with the main track (or to perform tracking), all to do is to control the tape speed so that the rotary head and the reproduced CUE signal of this waveform (A') synchronize each other.

It is to be noted that if the CUE signal is not used in tracking, but merely to detect the mode, there is no need for the CUE signal to synchronize with the rotary magnetic head. Therefore, the duty ratio is not necessarily 50%. Further, it is also not required that the CUE signal be of the rectangular waveform. For this case, a simplest form may be considered that when in the 1-channel mode, any of the CUE signals is out of use, while when in the 3-channel mode, only one CUE signal is used with its frequency being maintained constant throughout the recording. This form may also be modified in such a way that a signal of different frequency to that of the signal used when in the 3-channel mode is recorded only in a certain area at the start of recording in either of the 1-channel and 3-channel modes, for this signal is later used as the headout.

Though the foregoing embodiment has been described as the CUE signal differentiated in duty ratio and period between the 1-channel and 3-channel modes, it is to be understood that the present invention is not confined to the illustrated embodiment. It is applicable to another type of apparatus in which the number of channels of a signal and the number of modes can be set to desired values, and the signal to be supplied to the fixed head is not limited to the above-described one, and may be of any other form, provided that its waveform differs with different modes. For an example, the period is made the same for each mode, but the duty ratio alone is made different with different modes. For another example, a signal of high frequency is superimposed on the CUE signal Sa in part as shown on line (C) in FIG. 27 to permit the different between the signals on lines (A) and (C) to be used for detecting the mode. For still another example, the high frequency signal to be superimposed is made to differ in amplitude, frequency or phase with different modes. In this case, the mode can be detected more quickly than in the former case.

Figure 26:
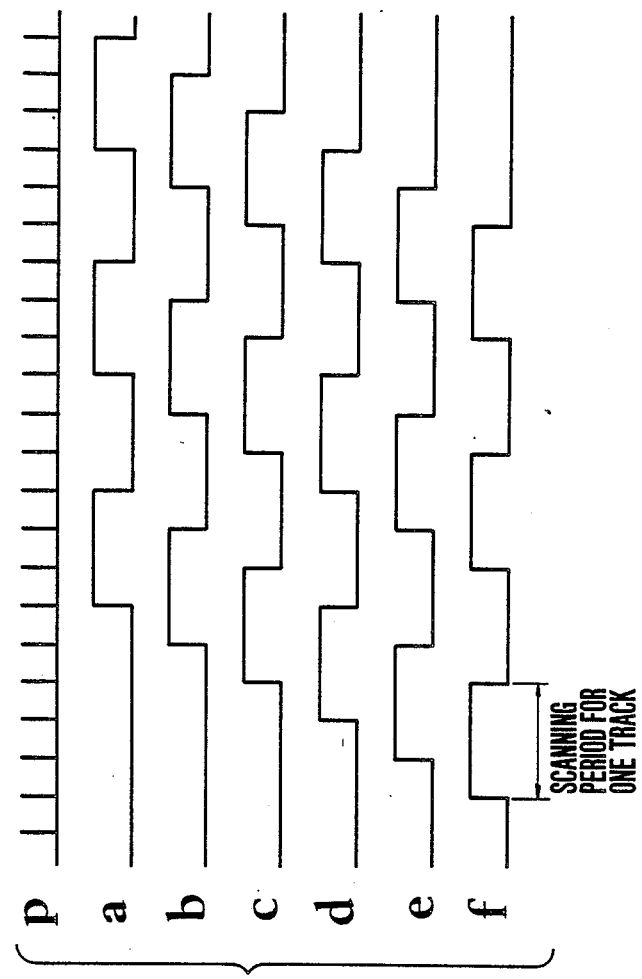
FIG. 26 is a timing chart of the head selection control signals.
Figure 27:
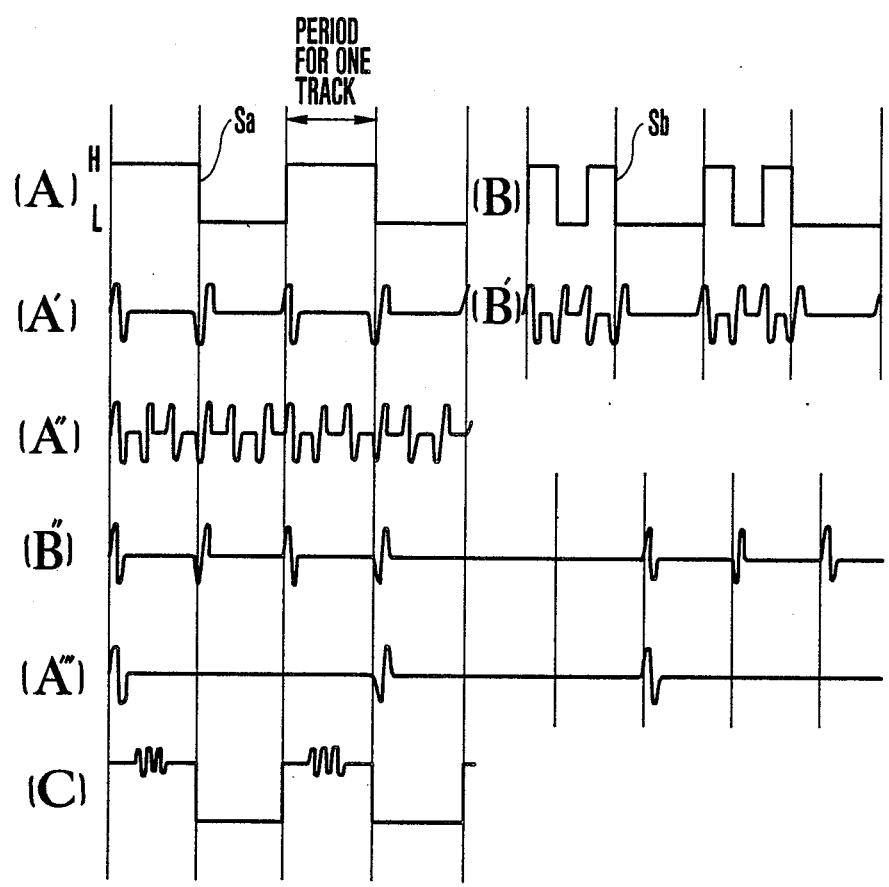
FIG. 27 is a timing chart of the CUE signal according to the fifth embodiment of the invention.

According to the embodiment of FIG. 25 to FIG. 27, even if the magnetic recording medium is used while mixing at random a first mode in which one channel of a signal is recorded and a second mode in which two or more channels of a signal are recorded, it is possible when in reproduction to detect each mode easily and quickly. This produces an advantage that the multichannel recording apparatus of the invention becomes compatible with another type of apparatus in which a single channel of a signal is always only possible to record.

What is claimed is:
1. A multi-channel recording apparatus comprising:
    (a) a cylinder member having n rotary heads (where n is an integer of not less than 3) on its outer peripheral surface to rotate with a phase difference of $(360/n)°$ from each other;
    (b) a tape guide member training a tape-shaped recording medium around said cylinder member over an angular range of not less than $(360(n-1)/n)°$;
    (c) means for inputting $(n-1)$ channels of a signal; and
    (d) recording means including supply means capable of supplying the inputted signals of $(n-1)$ channels to the $(n-1)$ of said n heads which are tracing on said recording medium, said supply means including $(n-1)$ switching means for circulating supply of said signals of $(n-1)$ channels to each of said n heads.

2. An apparatus according to claim 1, wherein said $(n-1)$ switching means are arranged to select one of said n heads for supply of one of said signals of $(n-1)$ channels thereto each time said rotary heads each rotate $(360/n)°$.

3. An apparatus according to claim 1, wherein said $(n-1)$ channels of a signal includes a video signal, and said n rotary heads each rotate $(360(n-1)/n)°$ in one vertical synchronous period.

4. An apparatus according to claim 3, wherein said $(n-1)$ channels of a signal include respective $(n-1)$ channels of a video signal whose vertical synchronizing signals are shifted $1/(n-1)$ of the vertical synchronous period from each other.

5. A multi-channel recording apparatus comprising:
(a) n rotary recording heads (where n is an integer of not less than 3) for rotating with a phase difference of $(360/n)°$ from each other;
(b) input means for inputting $(n-1)$ channels of a video signal;
(c) timing control means arranged to receive said $(n-1)$ channels of the video signal, for outputting $(n-1)$ channels of a video signal whose vertical synchronizing signals are shifted $1/(n-1)$ of the vertical synchronizing period from each other;
(d) recording means including $(n-1)$ switching means for respectively supplying said $(n-1)$ channels of the video signal outputted from said timing control means to each of said n rotary recording heads in turn.

6. An apparatus according to claim 5, wherein said timing control means includes separation means for separating vertical synchronizing signals of said $(n-1)$ channels of the video signal outputted from said timing control means, said timing control means shifts timings of at least $(n-2)$ of $(n-1)$ channels of the video signal by using said vertical synchronizing signals separated by said separation means.

* * * * *